United States Patent
Munyon

(10) Patent No.: US 6,177,877 B1
(45) Date of Patent: Jan. 23, 2001

(54) HAND-HELD PROGRAMMABLE SIGN WITH ROTATABLE HANDLE

(76) Inventor: Timothy Munyon, 2500 Great Hwy., San Francisco, CA (US) 94116

(*) Notice: Under 35 U.S.C. 154(b), the term of this patent shall be extended for 0 days.

(21) Appl. No.: 09/358,493

(22) Filed: Jul. 20, 1999

Related U.S. Application Data

(63) Continuation-in-part of application No. 09/027,632, filed on Feb. 23, 1998, now Pat. No. 5,973,607.

(51) Int. Cl.[7] ............................... G08B 5/00; G09G 5/00
(52) U.S. Cl. ................. 340/815.4; 340/321; 340/815.45; 345/168; 341/22; 40/586
(58) Field of Search ........................... 340/815.4, 815.45, 340/815.47, 527, 321, 479; 345/168, 905; 341/22; 40/446, 541, 584, 586, 612

(56) References Cited

U.S. PATENT DOCUMENTS

| | | | |
|---|---|---|---|
| 3,750,138 | * | 7/1973 | Burgan et al. ............. 340/332 |
| 4,534,012 | * | 8/1985 | Yokozawa ................. 368/10 |
| 4,928,084 | * | 5/1990 | Reiser ..................... 340/479 |
| 5,283,595 | * | 2/1994 | Krukovsky ................ 40/606 |

* cited by examiner

Primary Examiner—Donnie L. Crosland
(74) Attorney, Agent, or Firm—Edward Callahan

(57) ABSTRACT

A hand-held programmable sign comprising a hand-grip portion and a sign portion having opposed front and rear sides and including an upper sign portion and a lower hand-held portion rotatably mounted to the sign portion midway transverse to the sign portion in the in-use mode. The hand-grip portion can be rotated between the in-use mode and a locked storage mode when the hand-grip portion is rotated into overlapping relationship with the sign portion. A keyboard system with a miniaturized keyboard processor including keys marked with indicia for letters of the alphabet, numerals, and other selected indicia is mounted on the hand grip portion for operator input. The sign includes a miniaturized computer microprocessor for processing input data received from the keyboard. A miniaturized light-emitting message display, preferably an LED display, is mounted on the front side of the sign portion for reading by an observer. An electrical circuit in both the sign housing and the hand-grip housing joins the keyboard system, computer microprocessor, the light-emitting message display and an optional miniaturized monitor display system mounted on the rear side of the sign portion are joined by an electrical circuit in the housing and which can be internally or externally powered.

16 Claims, 25 Drawing Sheets

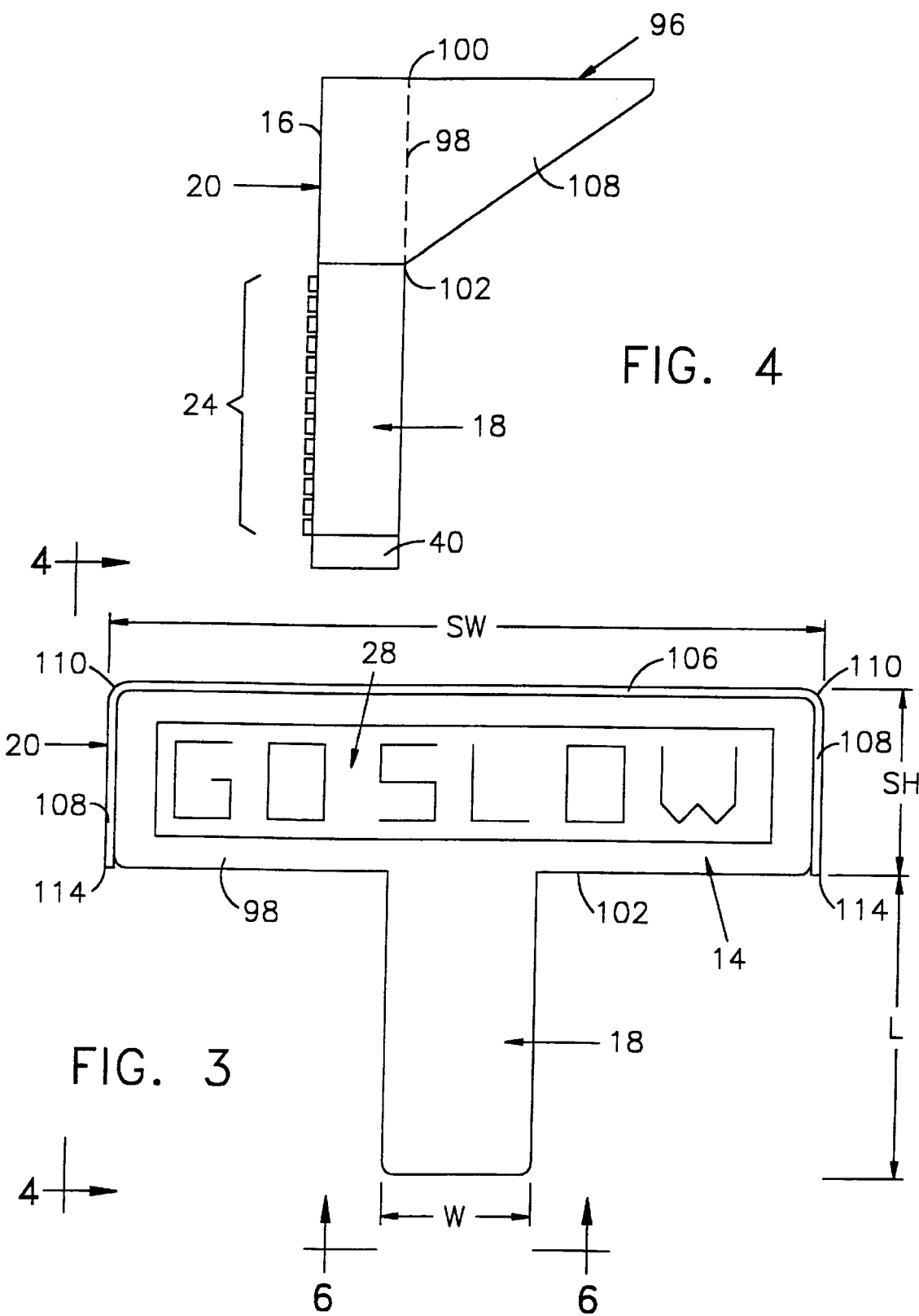

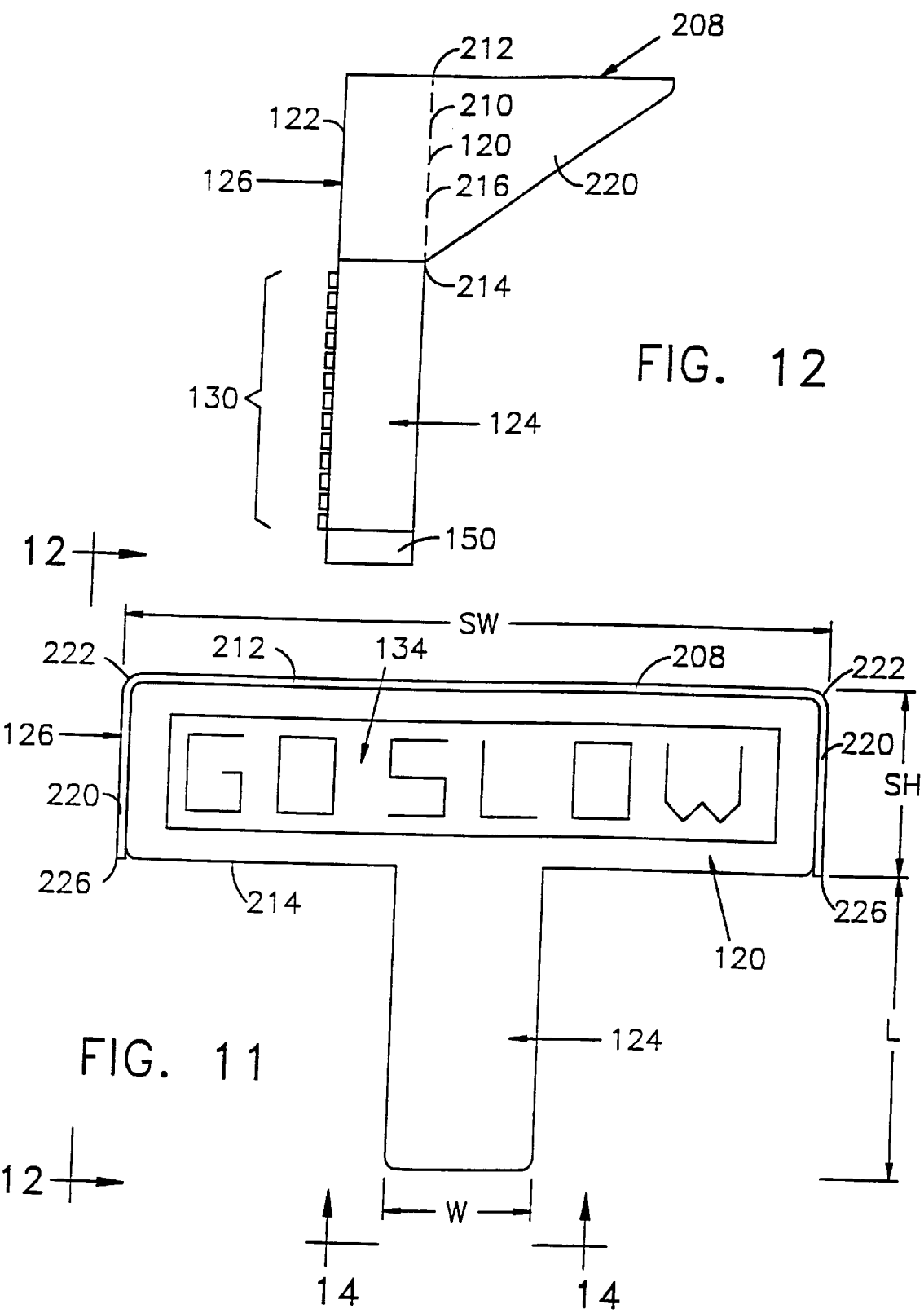

HAND-HELD PROGRAMMABLE SIGN WITH ROTATABLE HANDLE

HISTORY OF THE APPLICATION

This application is a continuation-in-part of application Ser. No. 09/027,632 filed Feb. 23, 1998, U.S. Pat. No. 5,973,607 entitled Hand-held Programmable Sign.

FIELD OF THE INVENTION

This invention relates to the fields of signs and microprocessors and in particular to a combination thereof.

BACKGROUND OF THE INVENTION

Messages are called for in many situations where speech cannot be used or can be used only with difficulty. A few examples are as follows: areas where noise levels are very high; areas where silence is preferred or in zero noise areas, such as in the military, during test taking or during church services; construction areas such as high buildings or in sewers where the voice cannot be heard clearly; boat to boat communications; and between swimmers or between a swimmer and a boat in underwater activity.

Computers have not been associated with portable, or hand-held, sign technology partly because monitor viewing screens are dominated by the fluorescent screen associated with the cathode ray tube (CRT) technology, which has until recently been bulky. Miniaturized microprocessor technology has recently allowed reduction of CRT monitors with displays that are as crisp and readable as laser printing on paper.

Computer display technology is presently used with displays that are based upon the well-known liquid crystal display (LCD), such as are used for messages displayed on the screens of bank cash vending machines. LCDs could be used in operative association with miniaturized microprocessor technology.

The same miniaturized technology has reduced motherboard processors so that an entire package including display and microprocessor is reduced to fit into a shirt pocket, that is to say, to the rectangular dimensions of a credit card. Such advances in miniaturized microprocessor technology can be applied as well to keyboard processors.

My application Ser. No. 09/027,632 provided a portable programmable sign comprising a unitary T-shaped housing having opposed front and rear sides and including an upper sign portion and a lower sign portion mounted midway transverse to the sign portion. A keyboard system with a miniaturized processor including keys marked with indicia for letters of the alphabet and other selected indicia are mounted on the hand-grip portion. Control keys are also mounted on the keyboard. The sign includes a miniaturized computer microprocessor for processing input data received from the keyboard. A miniaturized light-emitting message display system presents the input data to a distant observer by way of a light-emitting display, preferably an LED display mounted on the front side of the sign portion. An electrical circuit in the housing joins the keyboard system, the miniaturized computer microprocessor, and the LED message display, which can be internally or externally powered. In another embodiment of the invention set forth in application Ser. No. 09/027,632 provided a miniaturized monitor display system mounted on the rear side of the sign portion receives input data from the computer microprocessor prior to transmission of the input data so that a user can edit or verify the accuracy of the input data prior to transmission of the data to the LED message display.

Another embodiment of the present invention includes a hand-held programmable sign comprising a hand-grip portion and a sign portion having opposed front and rear sides and including an upper sign portion and a lower hand-held portion rotatably mounted to the sign portion midway transverse to the sign portion in the in-use mode. The hand-grip portion can be rotated between the in-use mode and a locked storage mode when the hand-grip portion is rotated into overlapping relationship with the sign portion. A keyboard system with a miniaturized keyboard processor including keys marked with indicia for letters of the alphabet, numerals, and other selected indicia is mounted on the hand grip portion for operator input. The sign includes a miniaturized computer microprocessor for processing input data received from the keyboard. A miniaturized light-emitting message display, preferably an LED display, is mounted on the front side of the sign portion for reading by an observer. An electrical circuit in both the sign housing and the hand-grip housing joins the keyboard system, computer microprocessor, the light-emitting message display and an optional miniaturized monitor display system mounted on the rear side of the sign portion are joined by an electrical circuit in the housing and which can be internally or externally powered. A rotatable locking mechanism about which the sign portion and the hand-held portion includes inner and outer cylinders that can be locked together by a locking pin controlled by the operator.

The hand-held programmable sign described in my application Ser. No. 09/027,632 has a T-shaped configuration. Such a configuration is efficient during operation, but when the sign is not in use, it is awkward to store it, for example, in a holding case or even placing in a drawer.

SUMMARY OF THE INVENTION

It is therefore the object of the present invention to provide a hand-held sign that has the advantages of my application Ser. No. 09/027,632 yet can be easily stored.

It is a further object of the present invention to provide an easily storable hand-held programmable sign that is both small and light enough to be easily hand-held and that encloses a complete computer including a keyboard with miniaturized keyboard microprocessor, a miniaturized computer microprocessor, and an LED screen with a miniaturized monitor microprocessor, so that a variety of messages can be input, or programmed, into the computer by a user and instantly be displayed and read by a message receiver, or observer.

It is also an object of the present invention to provide an easily storable hand-held programmable sign that is both small and light enough to be easily hand-held and that encloses a complete computer including a keyboard with miniaturized keyboard microprocessor, a miniaturized computer microprocessor, a large message display with a miniaturized monitor microprocessor, and a small LCD display monitor with miniaturized LCD microprocessor for proofreading and editing of messages prior to sending of messages at a full screen LED message display.

In accordance with these and other objects that will become apparent in the course of this disclosure, there is provided a hand-held programmable sign comprising a hand-grip portion and a sign portion having opposed front and rear sides and including an upper sign portion and a lower hand-held portion rotatably mounted to the sign portion midway transverse to the sign portion in the in-use mode. The hand-grip portion can be rotated between the in-use mode and a locked storage mode when the hand-grip portion is rotated into overlapping relationship with the sign portion. A keyboard system with a miniaturized keyboard processor including keys marked with indicia for letters of the alphabet, numerals, and other selected indicia is mounted on the hand grip portion for operator input. The sign includes a miniaturized computer microprocessor for processing input data received from the keyboard. A miniaturized light-emitting message display, preferably an LED display, is mounted on the front side of the sign portion for reading by an observer. An electrical circuit in both the sign housing and the hand-grip housing joins the keyboard system, computer microprocessor, the light-emitting message display and an optional miniaturized monitor display system mounted on the rear side of the sign portion are joined by an electrical circuit in the housing and which can be internally or externally powered. A rotatable locking mechanism about which the sign portion and the hand-held portion includes inner and outer cylinders that can be locked together by a locking pin controlled by the operator.

Other embodiments or modifications may be suggested to those having the benefit of the teachings therein, and such other embodiments or modifications are intended to be reserved especially as they fall within the scope and spirit of the subjoined claims.

BRIEF DESCRIPTION OF THE DRAWINGS

FIG. 3 is a frontal view of the sign shown in FIG. 1 with a message displayed on an LED display;

FIG. 4 is a side elevation view taken through line 4—4 in FIG. 3;

FIG. 11 is a frontal view of the sign shown in FIG. 9 with a message displayed on a screen thereon;

FIG. 12 is a side elevation view taken through line 12—12 in FIG. 11;

DESCRIPTION OF THE PREFERRED EMBODIMENT

Figure 1:
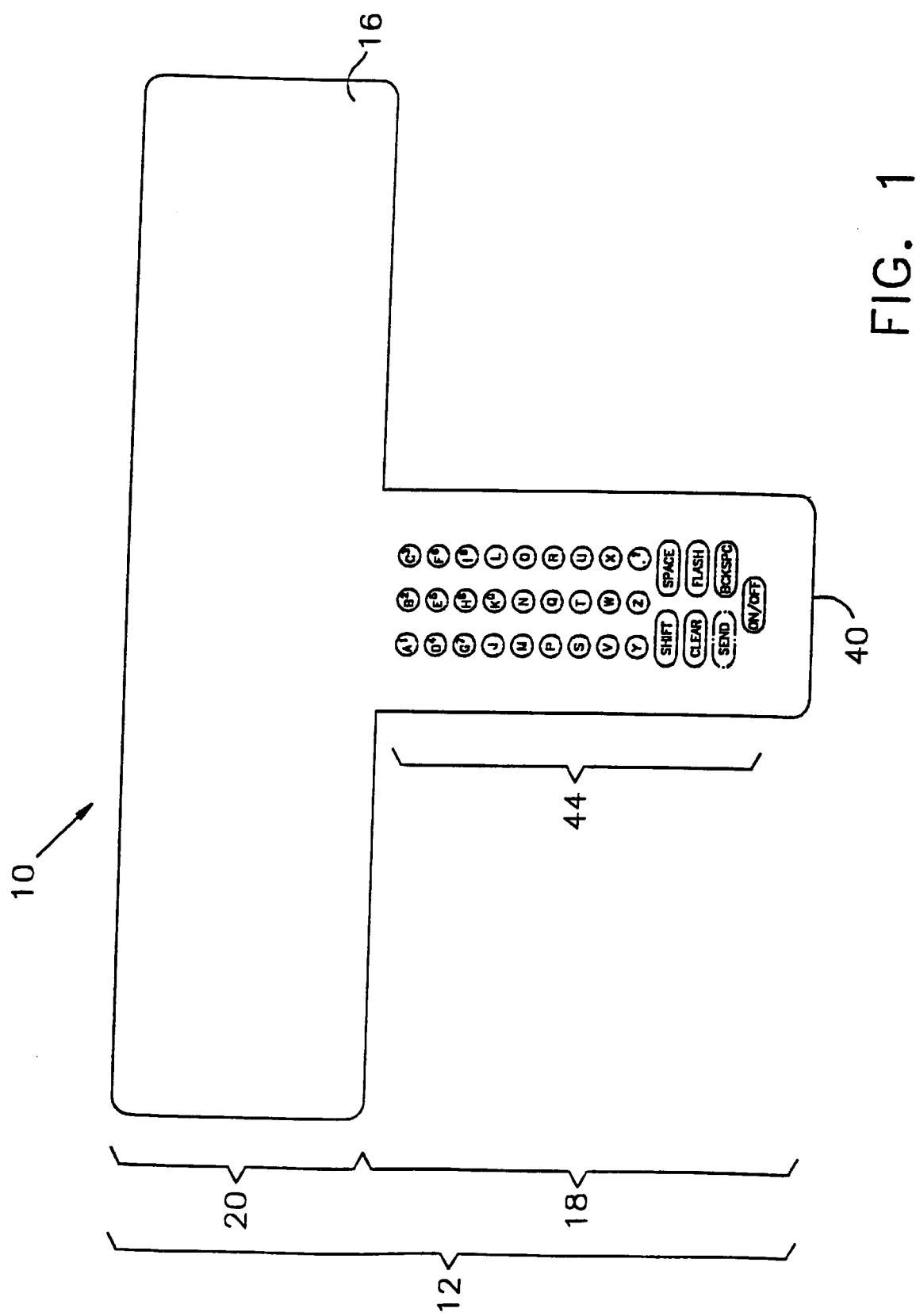
FIG. 1 is a rear view of a hand-held programmable sign in accordance with the present invention.

Reference is now made in detail to the drawings wherein the same numerals refer to the same or similar elements throughout.

A portable programmable sign 10 shown in FIGS. 1–8 includes a housing 12 having opposed front and rear sides 14 and 16, respectively, and a lower hand-grip portion 18 which is mounted transverse to an upper sign portion 20. As shown in FIG. 4, hand-grip portion 18 has a length L that is approximately 5 inches at a right angle to sign portion 20 and a width W that is approximately 2⅜ inches. Sign portion 20 has a sign width SW that is approximately 12 inches at right angles to hand-grip portion 18 and a sign height SH that is approximately 3 inches.

Figure 7:
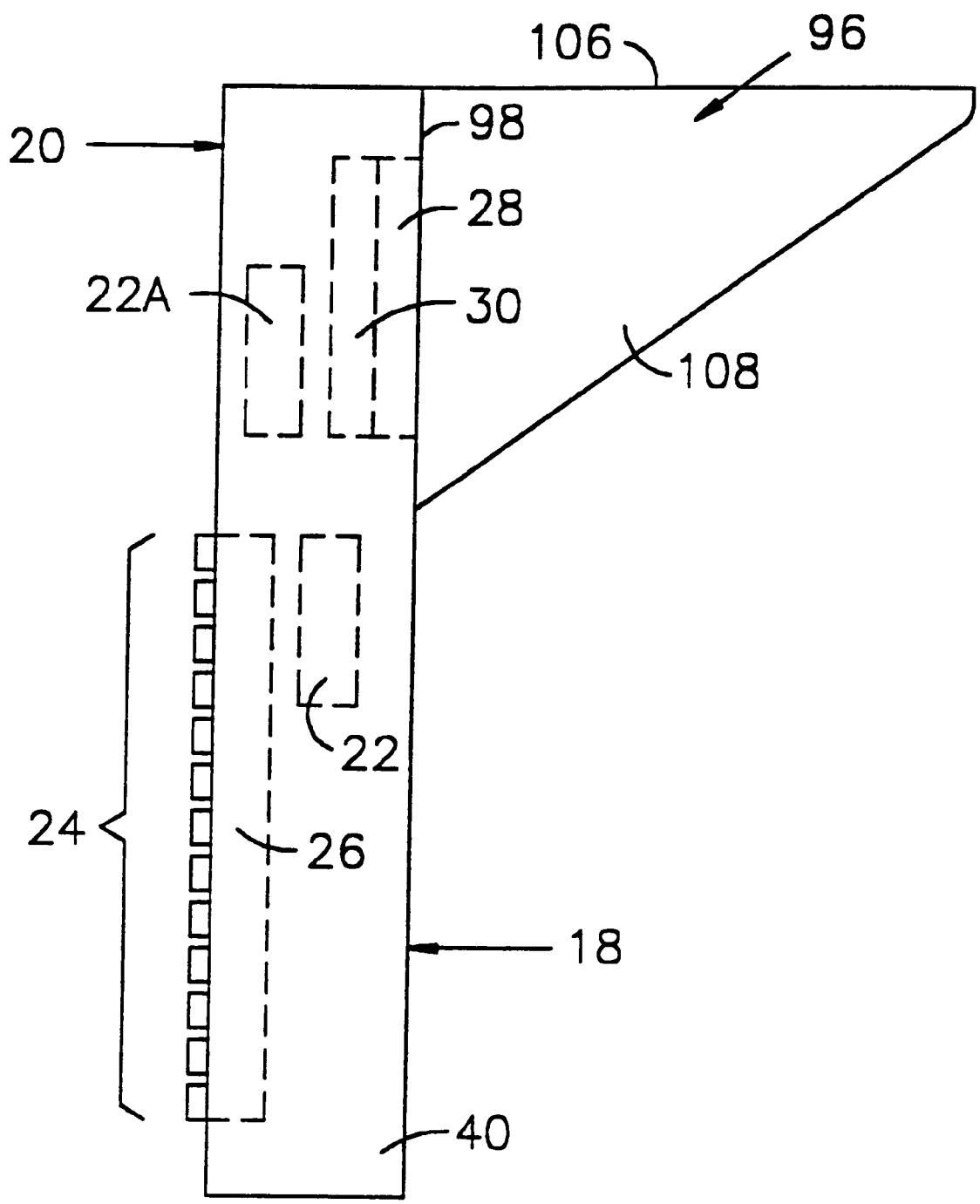
FIG. 7 is a side view of the hand-held sign in a side view analogous to the view of FIG. 4 with the keyboard processor, the computer microprocessor, and the LED processor and display generally indicated in dashed line and also showing a light shield for the LED display.

A miniaturized computer microprocessor 22 for processing data indicated in dashed line in FIG. 7 is mounted within housing 12, in particular in hand-grip portion 18. Alternatively, a computer miniaturized microprocessor shown as computer miniaturized microprocessor 22A can be mounted in sign portion 20 as indicated in phantom line. As shown in FIG. 7, a keyboard 24 is mounted on rear side 16 of hand-grip portion 18 and a miniaturized keyboard microprocessor 26 operatively connected with keyboard 24 is mounted within hand-grip portion 18. Keyboard microprocessor 26 receives input data from keyboard 24 and transmits the data to computer microprocessor 26. Keyboard 24 is preferably slightly smaller than a standard keyboard.

Figure 5:
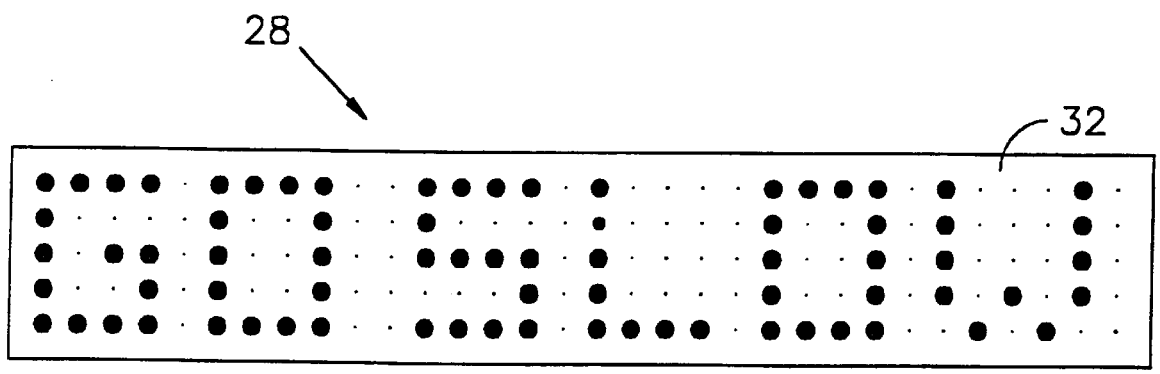
FIG. 5 is a view taken in isolation of the message display in FIG. 3 with indication of both activated and inactive light-emitting diodes (LEDs)
Figure 6:
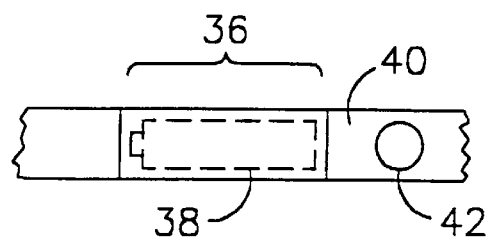
FIG. 6 is a view of the bottom side of the sign handle taken through line 6—6 in FIG. 3 showing internal and external power sources.

A light-emitting message display 28 shown in FIGS. 3 and 7 presents the data entered at keyboard 24 in visual form to observers. Message display 28 is mounted on front side 14 of sign portion 20. A miniaturized message display microprocessor 30 mounted in sign portion 20 as indicated in dashed line in FIG. 7 converts the input data received from computer microprocessor 22 for entry at message display 28. Message display 28 is preferably a light-emitting diode (LED) display 32 that transmits the color red. LED display 32 shown in FIG. 5 is presented on a 5×32 diode screen but such a configuration is shown for purposes of exposition only and will change in accordance with circumstances. A message 33 "GO SLOW" is shown by way of example as one of a number of possible messages. The screen size of LED display 32 is slightly smaller than the 12 inch by 3 inch dimensions of sign portion 20, which may be increased or decreased somewhat in accordance with circumstances and ease of handling sign 10 by a user. The actual size of LED display 32 varies in accordance with distances envisioned between the observer and sign 10 and environmental conditions such as night or day or whether the message is to be passed through a medium such as water, for example. LED display 32 is meant to be read by an observer positioned at a distance from sign 10 with the actual maximum distance desired varying in accordance with purpose and conditions anticipated. The actual dimensions of LED display 32 therefor can vary somewhat within the spirit of the invention.

Figure 8:
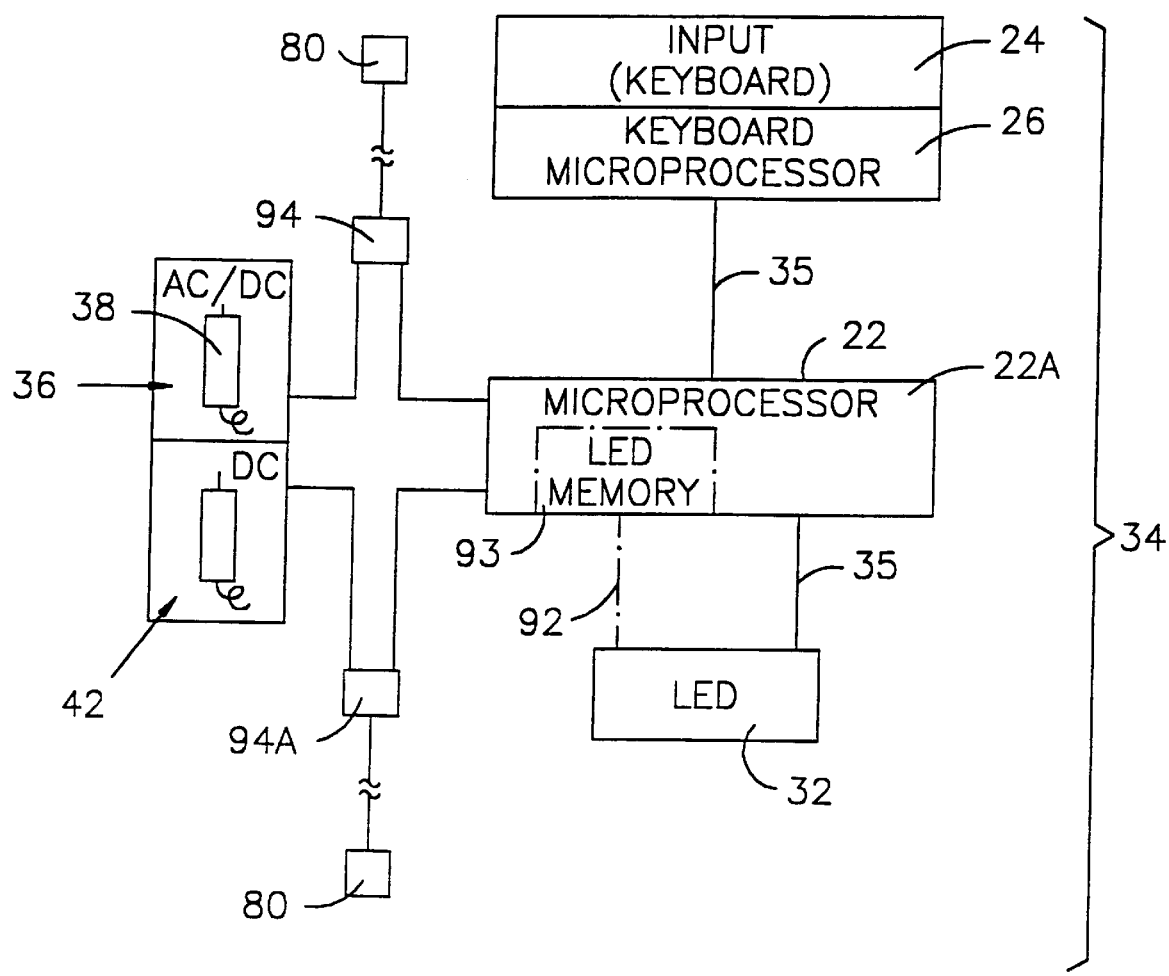
FIG. 8 is a simplified electrical diagram of the keyboard processor, the LED display, and the power supply.

As shown in FIG. 8, an electrical circuit 34 joins keyboard 24 and keyboard microprocessor 26 with computer microprocessor 22. Display microprocessor 30 and LED display 32 are also shown in FIG. 8. A circuit line 35 is indicated between computer microprocessor 22 and LED message display 32. A self-contained internal power source 36 comprising two batteries 38 supplies electrical current to circuit 34 is mounted at the base 40 of hand-grip portion 18. Alternatively, an external power source indicated as a power connector 42 that includes an AC/DC converter positioned in base 40 can be utilized by connection to an external power line (not shown).

Figure 2:
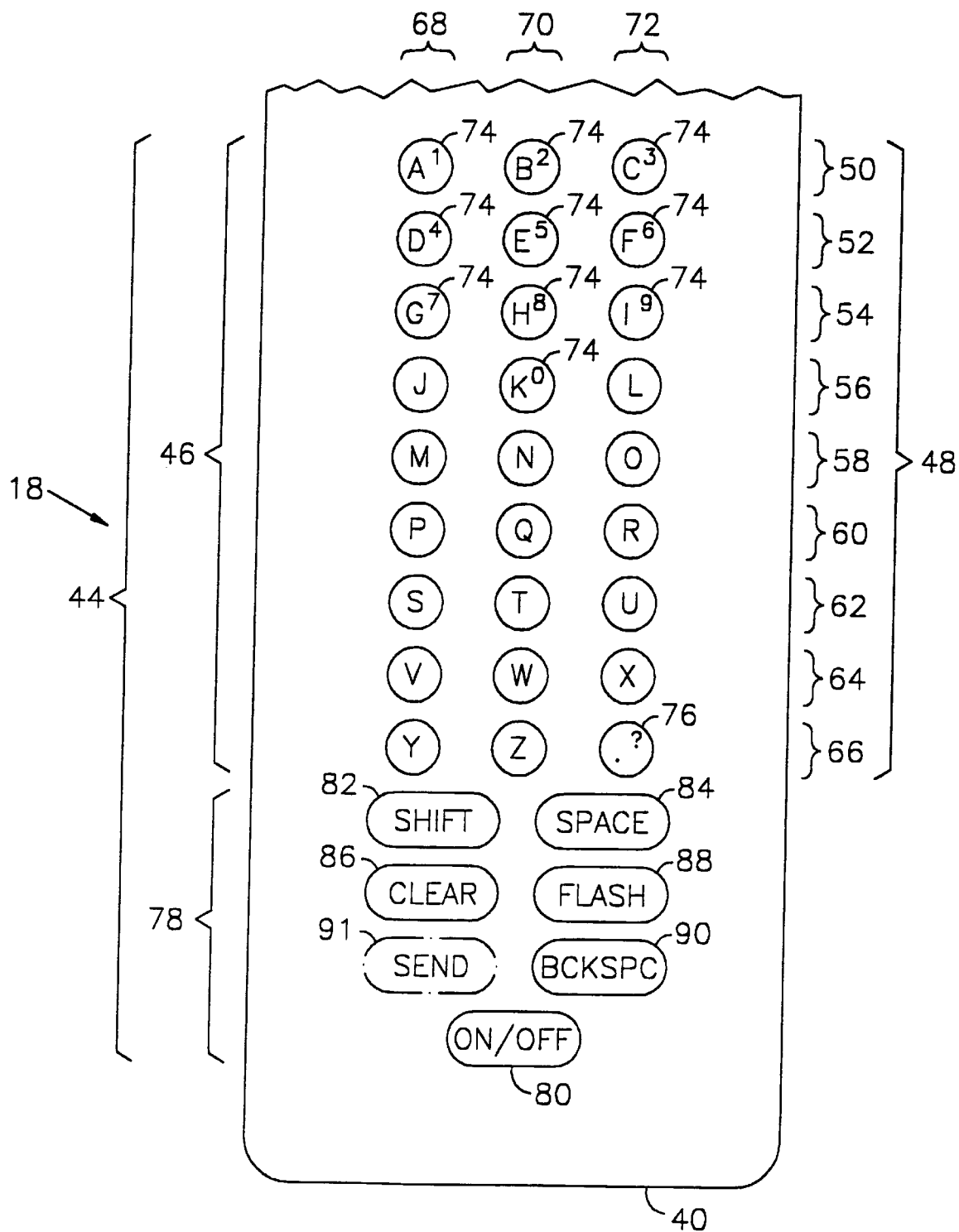
FIG. 2 is a view in isolation of the handle portion of the sign including a keyboard.

As best seen in FIG. 2, keyboard 24 includes an assemblage of systematically arranged keys 44 that are preferably slightly reduced in size than the standard keys on keyboards but still sized to receive finger tips for keystroke operation. Keys 44 are marked with indicia 46 representing the letters of the alphabet, ten numerals 0, 1, 2, 3, 4, 5, 6, 7, 8, and 9, and two grammatical signs, namely, a period and a question mark, all arranged in nine rows 48, specifically first row 50, second row 52, third row 54, fourth row 56, fifth row 58, sixth row 60, seventh row 62, eighth row 64, and ninth row 66 indicated from top to bottom sequence. Indicia 46 are also arranged in three files, namely first file 68, second file 70, and third file 72 indicated in left to right sequence. Files 68, 70, and 72 are oriented in parallel with length L of hand-grip portion 18. Indicia 46 of keys 44 are arranged with the commonly used sequence of letters of the alphabet, namely, A, B, C, D, E, F, G, H, I, J, K, L, M, N, O, P, Q, R, S, T, U, V, W, X, Y, Z, from top first row 50, first file 70 to the left marked with the letter A, and first row 50, second, or middle, file 70 marked with the letter B, and first row 50, third file from the left 72 marked with the letter C, and second row 52, first file 68 to the left marked with the letter D, and so on in sequence with the ninth row 66, third file 72 from the left being devoid of alphabetic indicia. Indicia 46 for ten basic numerals 0 through 9 are marked on certain keys 44 selected for dual alphabetic indicia and numeral indicia as follows: A, B, C, D, E, F, G, H, I, K, which are each additionally marked with numerical indicia 72, namely, 1, 2, 3, 4, 5, 6, 7, 8, 9, 0, respectively. Indicia 46 on keys 44 further include one grammatical key 76 that at ninth row 66, third file 72 and marked with both a period and a question mark.

The arrangement of keys 44 are shown and described relative to FIGS. 1 and 2 in a three-column and a nine-row configuration ordered in accordance with the standard order of the English alphabet. Such a configuration is presented merely for purposes of exposition. For example, the arrangement of keys 44 and indicia 46 can alternately be in accordance with the traditional arrangement of keys and indicia on standard computer keyboards with length L of hand-grip portion 18 serving as the viewing and operating base. Additional indicia representing grammatical and other signs can likewise be added in the spirit of the invention.

Keyboard 24 includes a set of six control keys 78 positioned below key row 66. Control keys 78 include an on/off key 80, a shift key 82, a space key 84, a clear key 86, a flash key 88, and a backspace (indicated as "bckspc") key 90. An optional send key 92 shown in phantom line is also positioned with control keys 78.

On/off key 80 is mechanically connected either to a mechanical open/closed switch 94 or a mechanical open/closed switch 94A, respectively, each of which is schematically set forth in FIG. 8. Open/closed switch 94 is movable between an open position and a closed position, wherein in the closed position switch 94 mechanically connects circuit 34 with internal power source 36, specifically batteries 38, and wherein in the open position circuit 34 is disconnected from internal power source 36. Alternatively, open/close switch 94A is movable between an closed position and an open position, wherein in the closed position open/closed switch 94A mechanically connects circuit 34 with external power connector 42, and wherein in the open position circuit 34 is disconnected from external power connector 42. Open/closed switches 94 and 94A are of a suitable type known in the art of switches, for example, biasably operated or other analogous types of mechanical switches. Operation of on/off key 80 serves to place circuit 34 in an electrically activate or inactivate mode.

Operation by a keystroke of shift key 82 activates all of ten combined alphabet-numeral keys between an alphabet mode and a numeral mode and operatively activates the combined grammatical symbols key 76 between the period mode and the question mark. Shift key 82 is operatively connected to keyboard microprocessor 26 for transmittal to computer microprocessor 22 for either a selected alphabetic indicia or a selected numeral of a selected combined alphabet-numeral key or for transmittal for either one of a pair of grammatical symbols as selected by a user.

Operation of space key 84 by a keystroke signals computer microprocessor 22 to transmit an electrical signal to display 28 to omit a space before the next key operation on keyboard 24.

Operation of clear key 86 by a keystroke signals computer microprocessor 22 to transmit an electrical signal to message display microprocessor 30 to remove all data from display screen 28.

Operation of flash key 88 by a keystroke signals computer microprocessor 22 to transmit an electrical signal to LED message display 28 to cause data being displayed on LED message display 28 to blink between light-emitting and non-light emitting modes.

Operation of backspace key 90 by a keystroke signals computer microprocessor 22 to transmit an electrical signal to LED message display 28 to remove data of one space.

An optional memory chip 93, designated herein as LED memory 93, associated with computer microprocessor 22 stores input data signaled from keyboard 24 and releases the input data stored therein upon a signal received from keyboard 24 by a keystroke operation of an optional seventh control key, namely, send key 91, for transmission by way of a circuit line 92, shown in phantom line in FIG. 8, from LED memory 93 to message display 32 for display. LED memory 93 includes an electronic memory chip switch transistor operable between on and off modes, wherein in the off mode the input data is stored in LED memory 93 and in the on mode the input data is released from LED memory 93 and transmitted for display at message display 32. The switch transistor of LED memory 93 returns by default to the off mode upon release of the input data.

A glare shield 96 connected to sign portion 20 of housing 12 shown in FIGS. 4, 5, and 7 reduces rays from external light from reaching and interfering with light emission from light-emitting message display 28. As seen in FIGS. 4, 5, and 7, sign portion 20 has a rectangular front wall 98 with opposed front wall upper and lower edges 100 and 102, respectively, and opposed front wall side edges 104. Glare shield 96 includes a rectangular shield top plate 106 transverse to and secured to front wall upper edge 100 and a pair of opposed triangular side plates 108 transverse to top plate 106 and secured to front wall side edges 104. Side plates 108 have side plate linear top edges 110 secured to shield top plate 106 and side plate linear side edges 112 secured to and coextensive with front wall side edges 104. Side plate bottom points 114 are secured to front wall lower edge 102.

Figure 9:
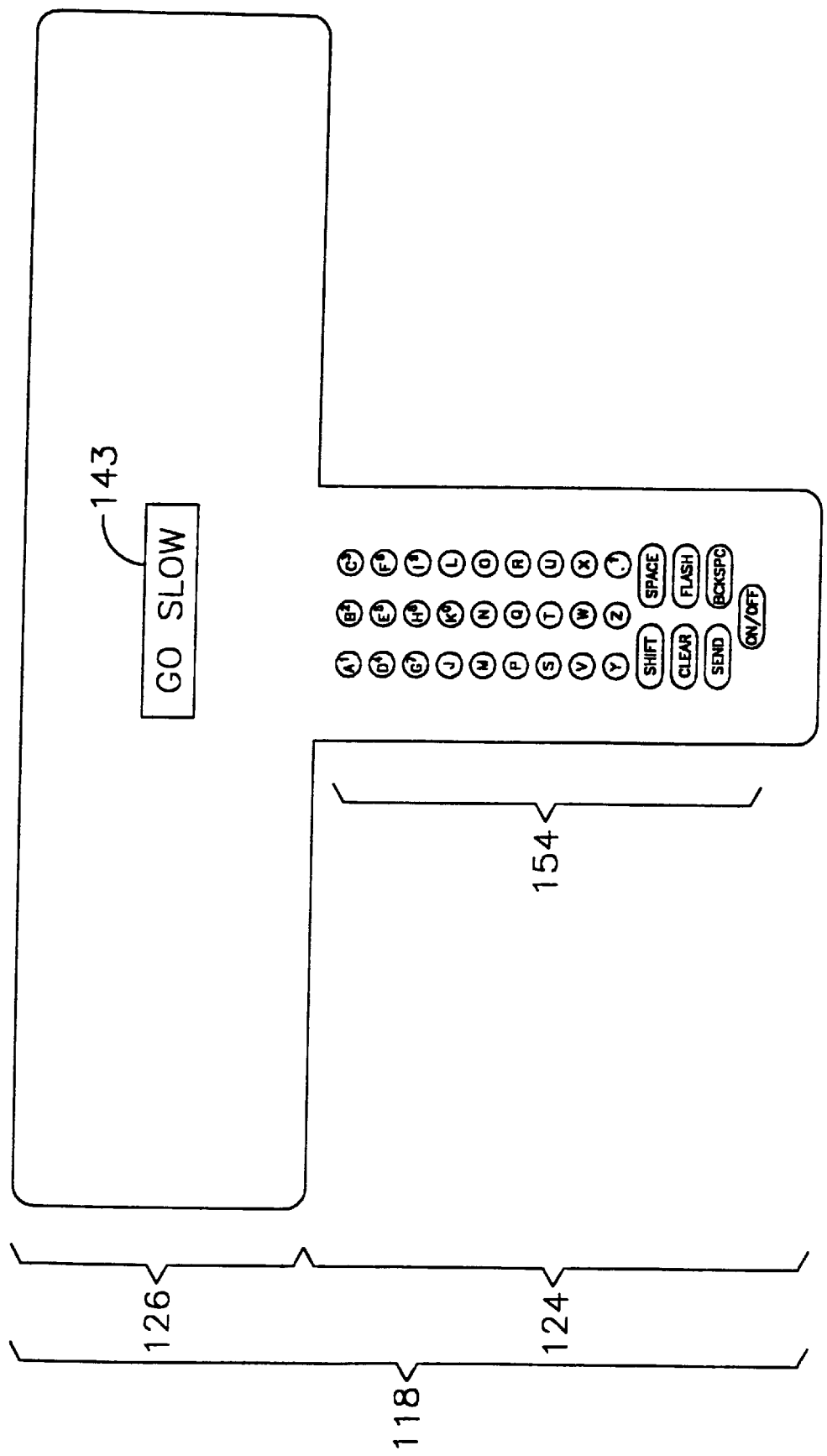
FIG. 9 is a rear view of another embodiment of the hand-held programmable sign in accordance with the present invention.
Figure 15:
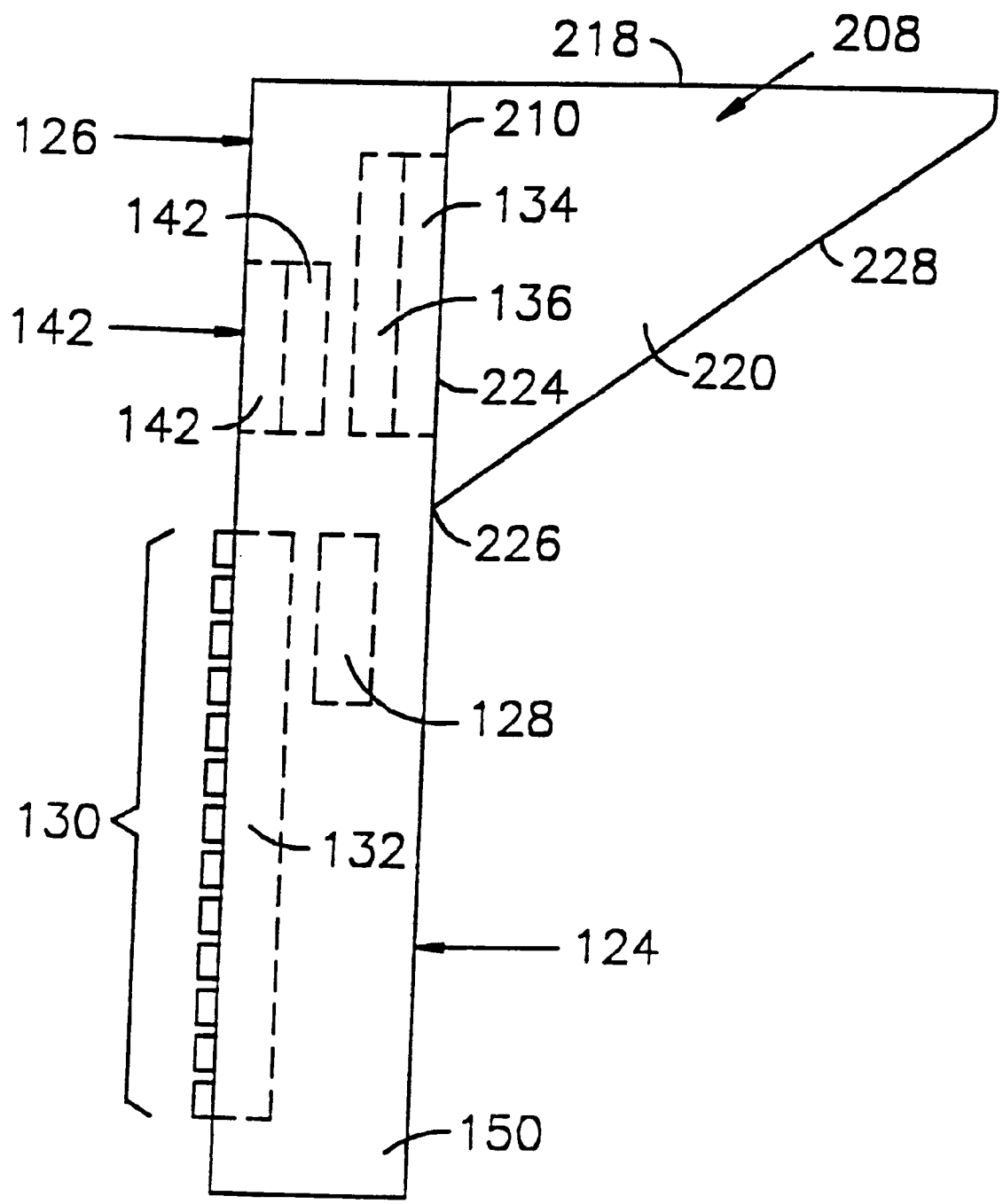
FIG. 15 is a side view of the hand-held sign in a side view analogous to the view of FIG. 12 with the positions of the keyboard microprocessor, the computer microprocessor, the LCD microprocessor and screen and the LED screen and LED microprocessor generally indicated in dashed line.

An alternative embodiment of the invention herein is shown in FIGS. 9–16 wherein a portable programmable sign 116 shown in FIGS. 9, 12, and 15 includes a housing 118 having opposed front and rear sides 120 and 122. respectively. Housing 118 includes a lower hand-grip portion 124 which is mounted transverse to an upper sign portion 126. Hand-grip portion 124 has a length L that is approximately 5 inches at a right angle to sign portion 126 and a width W that is approximately 2⅜ inches. Sign portion 126 has a sign width SW that is approximately 12 inches at right angles to hand-grip portion 124 and a sign height SH that is approximately 3 inches.

A miniaturized computer microprocessor 128 for processing data indicated in dashed line in FIG. 15 is mounted within housing 118, in particular in hand-grip portion 124. Alternatively, computer microprocessor 128 can be mounted in sign portion 126 (not shown). As shown in FIGS. 9, 12, and 15, a keyboard 130 is mounted on rear side 122 of hand-grip portion 124 and a miniaturized keyboard microprocessor 132 operatively connected with keyboard 130 is mounted within hand-grip portion 124. Keyboard 130 is preferably slightly smaller than a standard keyboard. Keyboard microprocessor 132 is for receiving input data from keyboard 130 and transmitting the data to computer microprocessor 132.

display microprocessor 136 mounted in sign portion 126 as

Figure 13:
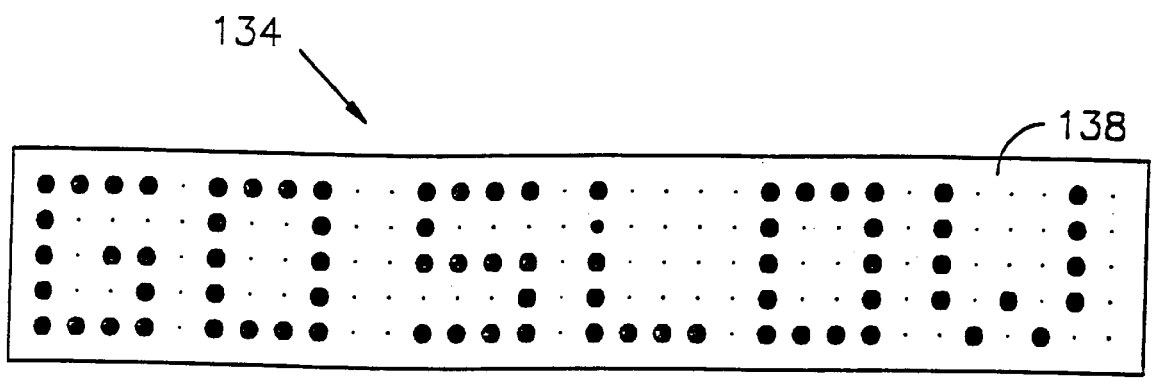
FIG. 13 is a view taken in isolation of the message screen in FIG. 11 illustrating in detail an LED display including indication of both activated and inactive light emitting diodes.
Figure 14:
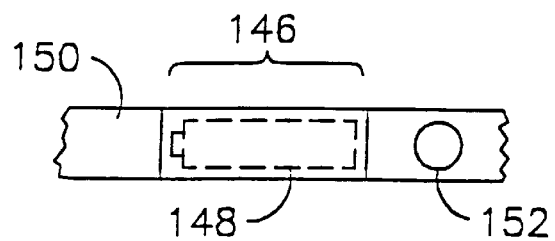
FIG. 14 is a view of the bottom side of the sign handle taken through line 14—14 in FIG. 11 showing both internal and external power sources.

A light-emitting message display 134 shown in FIGS. 11 and 13 presents the data entered at keyboard 130 in visual form to observers. Message display 134 is mounted at front side 120 of sign portion 126. A miniaturized message indicated in dashed line in FIG. 15 converts the input data received from computer microprocessor 128 for entry at message display 134. Message display 134 is preferably an LED display 138 that transmits the color red. LED display 138 shown in FIG. 13 is presented on a 5×32 diode screen but such a configuration is shown for purposes of exposition only and will change in accordance with circumstances. A message 139 "GO SLOW" is shown by way of example as one of a number of possible messages. The screen size of LED display 138 is slightly smaller than the 12 inch by 3 inch dimensions of sign portion 126, which may be increased or decreased somewhat in accordance with circumstances and ease of handling sign 116 by a user. Actual size of LED display 138 varies in accordance with distances envisioned between the observer and sign 116 and environmental conditions such as night or day or whether the message is to be passed through a medium such as water, for example.

A monitor 140 shown in FIGS. 9 and 15 is mounted at rear side 122 of sign portion 126 of housing 118. Monitor 140 includes a miniaturized monitor microprocessor 142 and a monitor display 143 that is a liquid crystal display (LCD). Monitor 140 receives input data from computer microprocessor 128 entered at keyboard 130. Monitor display 143 enables a user to verify the accuracy of the input data being displayed prior to entry of the data for display at LED display 138.

Figure 16:
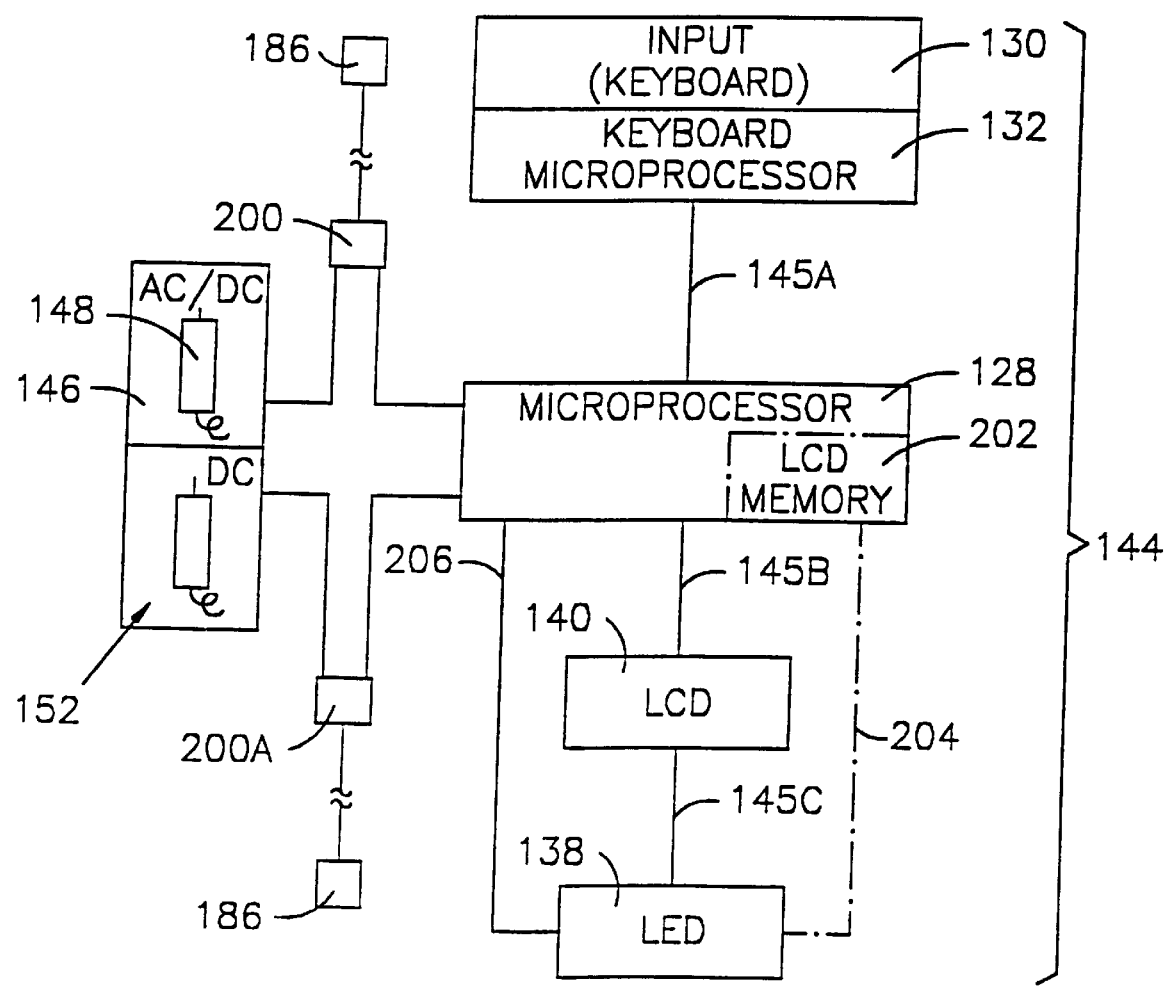
FIG. 16 is a simplified electrical diagram of the keyboard, the miniaturized microprocessor, the LED display assembly, the LCD monitor, power on/off switches, and alternative internal and external power sources.

An electrical circuit 144 that electrically joins keyboard 130 and keyboard microprocessor 132 with computer microprocessor 128 and message display microprocessor 136 and LED display 138 is shown in FIG. 16. Circuit 144 includes a circuit line 145A between keyboard microprocessor 132 and computer microprocessor 128, a circuit line 145B between computer microprocessor 128 and LCD 140, and a circuit line 145C between LCD 140 and LED 138. monitor display 143. A self-contained internal power source 146 that comprises a pair of batteries 148 at supplies electrical current to circuit 144 is mounted at the base 150 of hand-grip portion 124. Alternatively, an external power source indicated as a power connector 152 including an AC/DC converter positioned in base 150 can be utilized by connection to an external power line.

Figure 10:
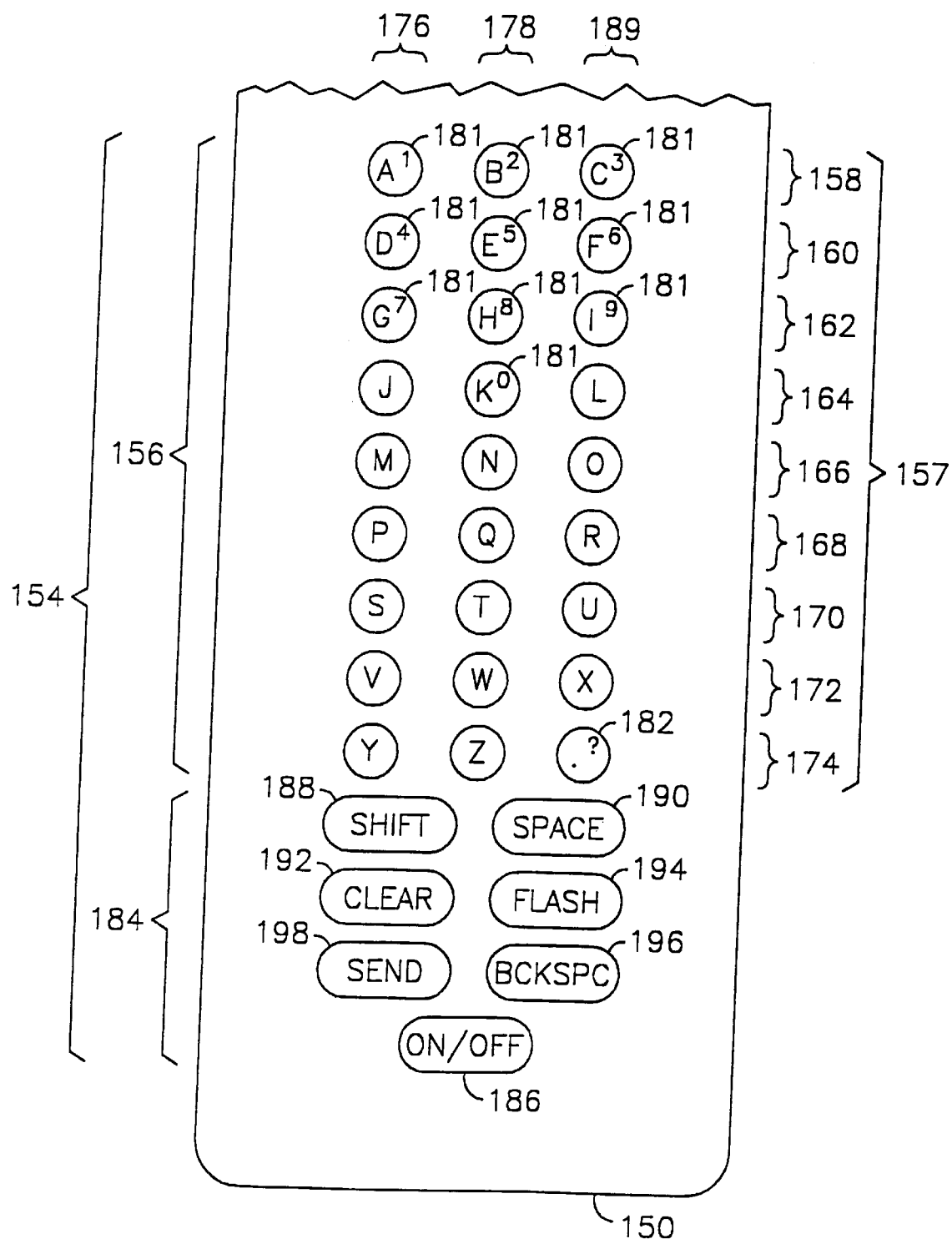
FIG. 10 is a view in isolation of the handle portion of the sign shown in FIG. 9 including the keyboard.

As best seen in FIG. 10, keyboard 130 includes an assemblage of systematically arranged keys 154 that are preferably slightly reduced in size than the standard keys on keyboards but still sized to receive finger tips for keystroke operation. Keys 154 operatively representing the letters of the alphabet, ten numerals 0, 1, 2, 3, 4, 5, 6, 7, 8, and 9, and grammatical signs period and question mark, all generally indicated as indicia 156 arranged in nine rows 157, specifically rows first row 158, second row 160, third row 162, fourth row 164, fifth row 166, sixth row 168, seventh row 170, eighth row 172, and ninth row 174 indicated from top to bottom sequence, and three files, namely, first file 176, second file 178, and third file 180, indicated in left to right sequence. Indicia rows 158, 160, 162, 164, 166, 168, 170, and 174 are oriented in parallel with length L of hand-grip portion 124 with first row 158 being most proximate to sign portion 126. Indicia 156 of keys 154 are arranged with the commonly used sequence of letters of the alphabet, namely, A, B, C, D, E, F, G, H, I, J, K, L, M, N, O, P, Q, R, S, T, U, V, W, X, Y, Z, placed in sequence from top first row 158, first file 176 to the left with the letter A, and first row 158, second, or middle, file 178 with the letter B, and first row 158, third file from the left 180 with the letter C, and second row 160, first file 176 to the left with the letter D, and so on in sequence with the ninth row 174, third file 180 from the left devoid of alphabetic indicia. Indicia 156 representing the ten basic numerals 0 through 9 are indicated on certain keys 154 selected for dual alphabetic indicia and numeral indicia are as follows: A, B, C, D, E, F, G, H, I, K, which are each additionally marked with numerical indicia 181, namely, 1, 2, 3, 4, 5, 6, 7, 8, 9, 0, respectively. Keys 154 further include indicia 156 marked on one grammatical key 182 in ninth row 174, third file 180 with both a period and a question mark.

The arrangement of keys 154 and indicia 156 are shown and have been described relative to FIG. 10 in a three-column and a nine-row configuration ordered in accordance with the standard order of the English alphabet. Such a configuration is presented merely for purposes of exposition. For example, the arrangement of keys 154 and indicia 156 can alternately be in accordance with the traditional arrangement of keys on standard computer keyboards with keyboard length L of hand-grip portion 124 serving as the viewing and operating base. Additional grammatical signs can likewise be added in the spirit of the invention.

Keyboard 130 includes a set of seven control keys 184 positioned below key ninth row 174. Control keys 184 include an on/off key 186, a shift key 188, a space key 190, a clear key 192, a flash key 194, a backspace (indicated as "bckspc") key 196, and a send key 198.

On/off key 186 is mechanically connected either to a mechanical open/closed switch 200 or a mechanical open/closed switch 200A each of which is schematically set forth in FIG. 16. Open/closed switch 200 is movable between a closed position and an open position, wherein in the closed position switch 200 mechanically connects electrical circuit 144 with internal power source 146, specifically batteries 148, and wherein in the open position electrical circuit 144 is disconnected from internal power source 146. Alternative open/closed switch 200A is movable between a closed position and a open position, wherein in the closed position open/closed switch 200A mechanically connects electrical circuit 144 with external power connector 152, and wherein in the open position electrical circuit 144 is disconnected from external power connector 152. Open/closed switches 200 and 200A are suitable mechanical switches known in the art, for example, biasably operated or other analogous types of mechanical switches. Operation by keystroke of on/off key 186 activates switches 200 or 200A so as to place electrical circuit 144 in an electrically activate or inactivate mode.

Operation by keystroke of shift key 188 activates all of ten combined alphabet-numeral keys between an alphabet mode and a numeral mode and operatively activates the combined grammatical symbols 182 between the period mode and the question mark. Shift key 188 is operatively connected to keyboard microprocessor 132 for transmittal to computer microprocessor 128 for positioning selected alphabetic indicia or a selected numeral of a selected combined alphabet-numeral key or one of a pair of grammatical symbols as selected by a user into a mode for subsequent electrical transmittal to computer microprocessor 128 in response to a keystroke at the selected key.

Operation by keystroke of space key 190 signals computer microprocessor 128 to transmit an electrical signal by way of circuit line 145 to monitor microprocessor 142 to omit a data space on monitor LCD display 143 before the next keystroke operation on keyboard 130.

Operation by keystroke of clear key 192 signals computer microprocessor 128 to transmit an electrical signal by way of circuit line 145 to monitor display microprocessor 142 to remove all data from monitor LCD display 143.

Operation of backspace key 196 signals computer microprocessor 128 to transmit an electrical signal by way of circuit line 145 to monitor display microprocessor 142 to omit a data space on monitor LCD display 143.

An optional data memory chip 202, designated herein as LED memory 202 and shown in phantom line in FIG. 16 and associated with computer microprocessor 128, stores input data signaled from keyboard 130 and computer microprocessor 128 and releases the input data upon a signal received by keystroke operation of send key 198 on keyboard 130 for display at message display 134. LED memory 202 includes a switch transistor operable between on and off modes, wherein in the off mode input data is continually stored in LED memory 202, and in the on mode the input data stored in LED memory 202 is released for transmittal by way a circuit line 204 shown in phantom line between LED memory 202 and message display 134. The memory switch transistor of LED memory 202 defaults to the off mode upon release of the input data to message display 134 in readiness to receive the next input data from keyboard 130.

Operation by a keystroke of flash key 194 sends a signal by way a secondary circuit 206 from computer microprocessor 128 by circuit line 145C or by a secondary circuit line 206 to message LED display 138 to cause the input data message being display thereon to blink between light-emitting and non-light-emitting modes.

A glare shield 208 connected to sign portion 126 of housing 12 shown in FIGS. 11, 12, and 15 reduces rays from external light from reaching and interfering with light emission from message display 134. Sign portion 126 has a rectangular front wall 210 with opposed front wall upper and lower edges 212 and 214, respectively, and opposed front wall side edges 216. Glare shield 208 includes a rectangular shield top plate 218 transverse to and secured to front wall upper edge 212 and a pair of opposed triangular side plates 220 transverse to top plate 218 and secured to front wall side edges 216. Side plates 220 have side plate linear top edges 222 secured to shield top plate 218 and side plate linear side edges 224 secured to and coextensive with front wall side edges 216. Side plate bottom points 224 are secured to front wall lower edge 214.

Figure 17:
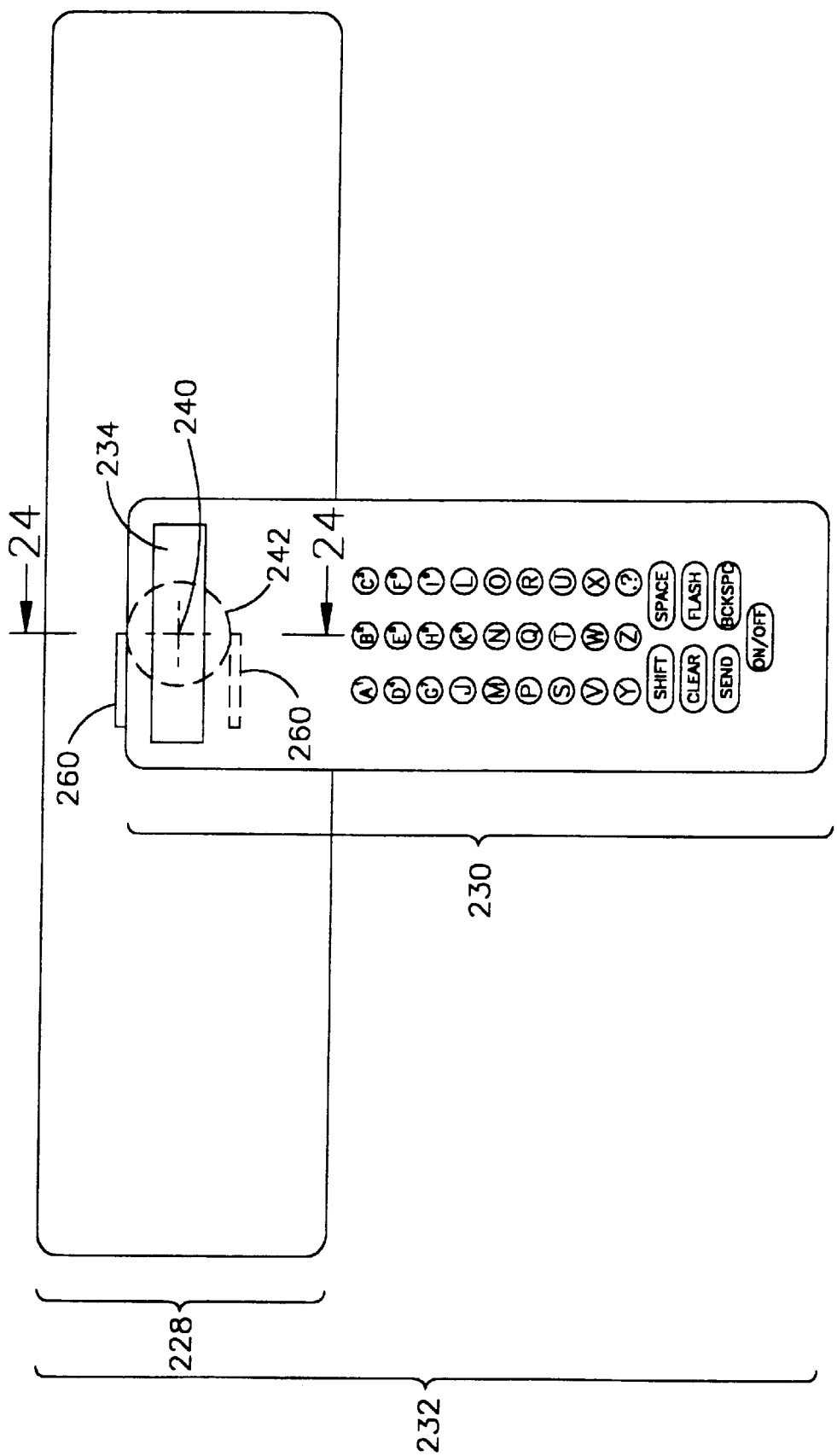
FIG. 17 is a rear view of another embodiment of a hand-held programmable sign including a rotatable hand-grip portion.
Figure 18:
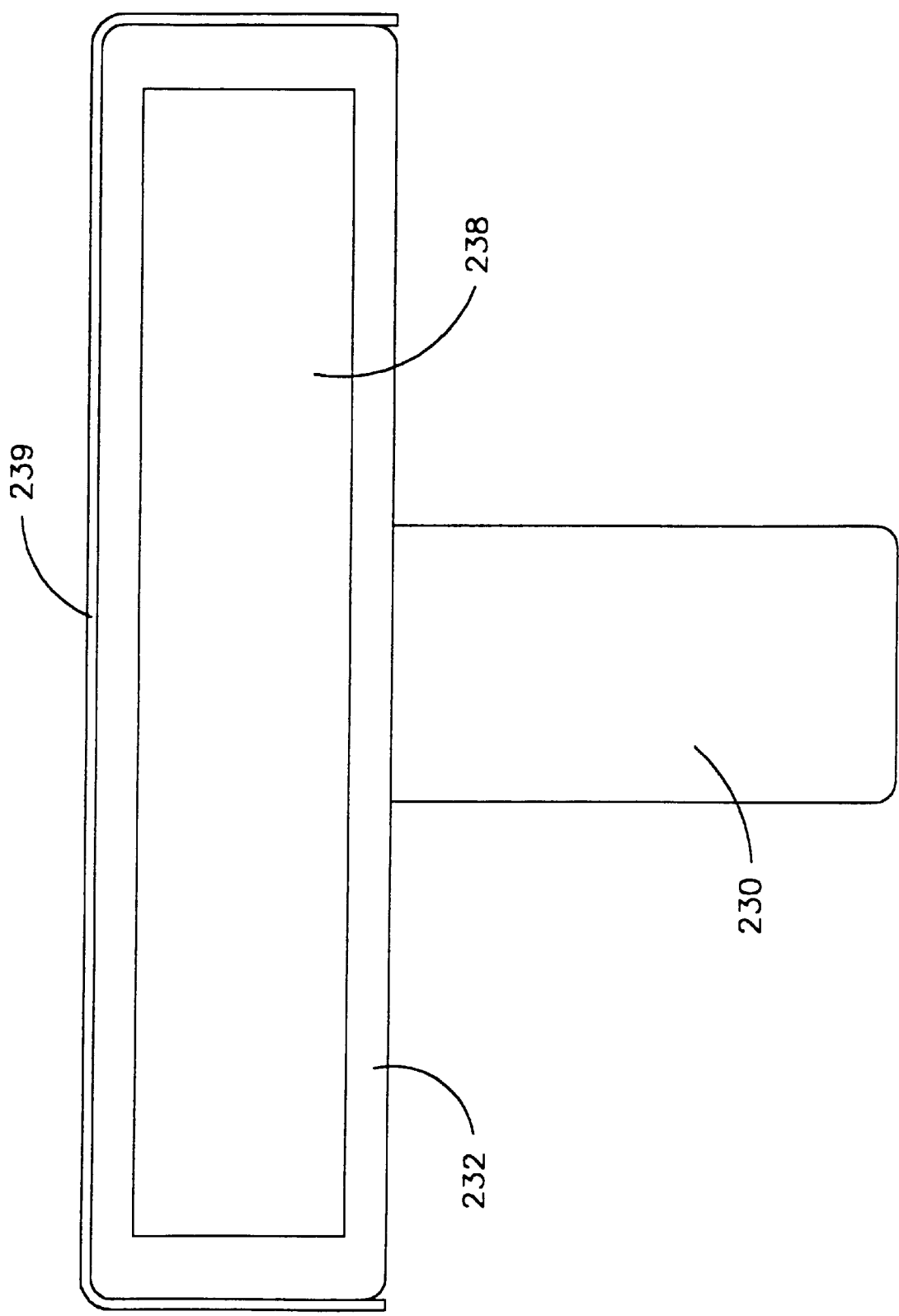
FIG. 18 is a front view of the embodiment of the hand-held programmable sign shown in FIG. 17 showing a light-emitting diode display.
Figure 21:
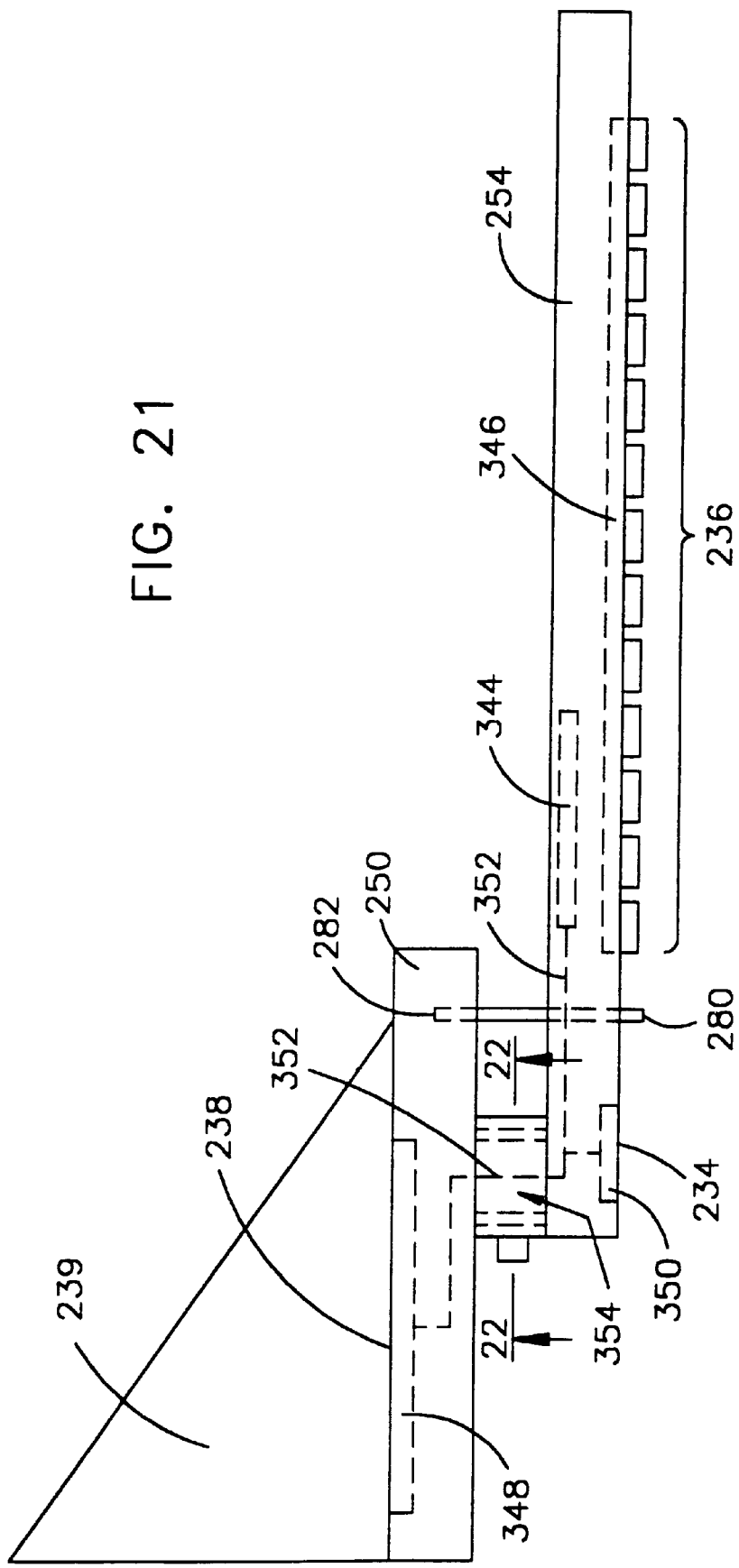
FIG. 21 is a side view of the hand-held programmable sign shown in FIGS. 17–19 with the hand-held portion being in the in-use mode as shown in FIG. 17.

Another embodiment of the present invention shown in FIG. 17 is a rear view of a portable hand-held programmable sign 228 that is in general analogous to the hand-held programmable signs 10 and 116 shown in FIGS. 1 and 9. Hand-held programmable sign 228 includes a vertical hand-grip portion 230 and a horizontal sign portion 232. In accordance with the present invention, an optional LCD 234 and a keyboard 236 are mounted to the rear side of hand-grip portion 230 analogous to the prior descriptions related to hand-held programmable sign 10 and 116. The front side of hand-held programmable sign portion 232, specifically the front side of sign portion 232 as shown in FIG. 18, has an LED display 238 that is analogous to LED displays 32 and 138 previously described in relation to hand-held signs 10 and 116 and as shown in FIGS. 3 and 11. FIG. 17 shows hand-grip portion 230 in a use mode that provides a hand grip for the user during entry of message data at keyboard 236. The message entered can be optionally proofread at LCD monitor 234 before it is sent at LED display 240. Hand-grip portion 230 is held by the user in position for sending the entered message shown on the LED display 238 on the front side of sign portion 232. FIGS. 18 and 21 show a glare screen 239 over LED 234 attached to the top and side walls of the front side of sign portion 232.

Figure 19:
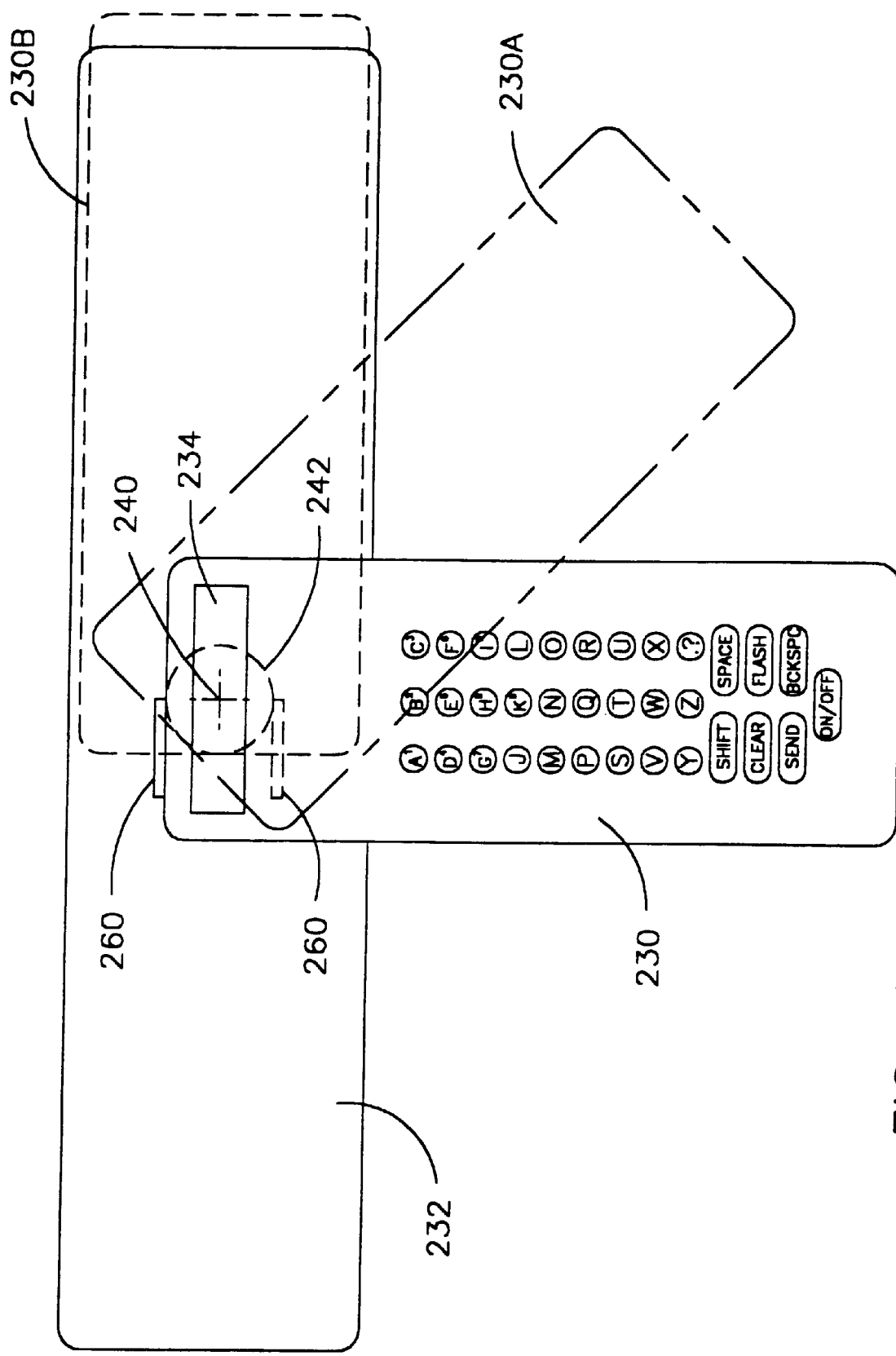
FIG. 19 is a front view of the hand-held programmable sign shown in FIGS. 17 and 18 showing the hand-grip portion being rotated from the vertical in-use mode to a horizontal position.

FIG. 19 shows hand-grip portion 230 being moved from a vertical in-use mode shown in FIGS. 17 and 18 to a horizontal position in preparation for being moved to a storage mode. Specifically, hand-grip portion 230 is shown being rotated about a center of rotation 240 located at the horizontal mid-length of sign portion 232. The direction of rotation is counter-clockwise as viewed relative to FIG. 18 with a first interim position being shown in phantom line as hand-grip portion 230A and a second interim position shown in phantom line as hand-grip portion 230B in elongated horizontal alignment with sign portion 232 with first interim position of hand-grip portion 230A being generally midway between in use vertical position 230 and second interim position 230B for purposes of exposition only.

Figure 20:
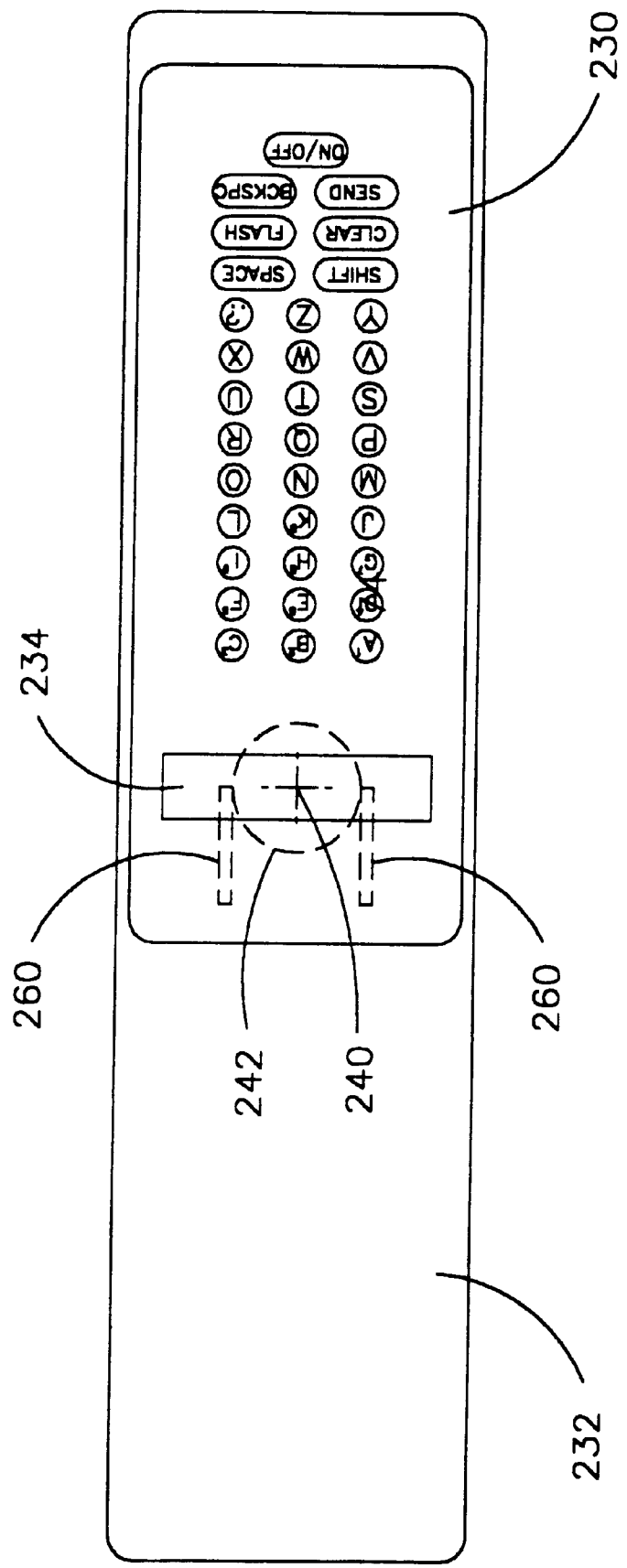
FIG. 20 is a rear view of the hand-held programmable sign shown in FIGS. 17 and 18 with the hand-grip portion having been moved laterally from the horizontal position shown in FIG. 19 to a locked compact storage mode.

FIG. 20 shows hand-grip portion 230 having been slid in a right to left direction as viewed relative to FIG. 20 to a final fully rotated, or compact, or folded mode relative to sign portion 232. Hand-grip portion 230 is located totally within the side edges of sign portion 232 in the final compact mode so that hand-held programmable sign 228 can be easily stored than is the case the T-shaped configuration shown in FIGS. 1 and 9.

Figure 22:
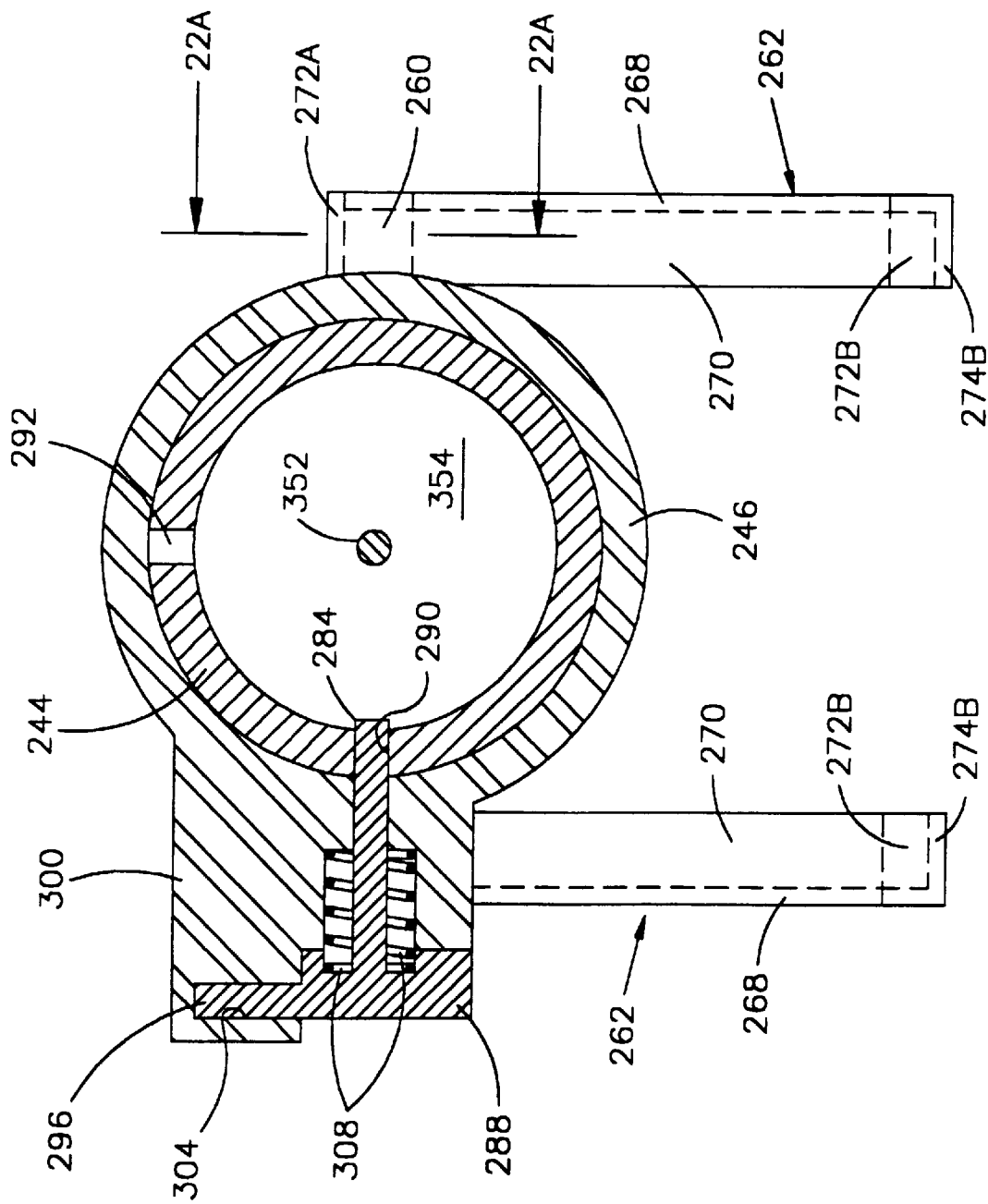
FIG. 22 is a sectional view of the cylindrical rotating mechanism taken through line 21—21 in FIG. 20 with the cylindrical rotating mechanism in a locked mode.
Figure 23:
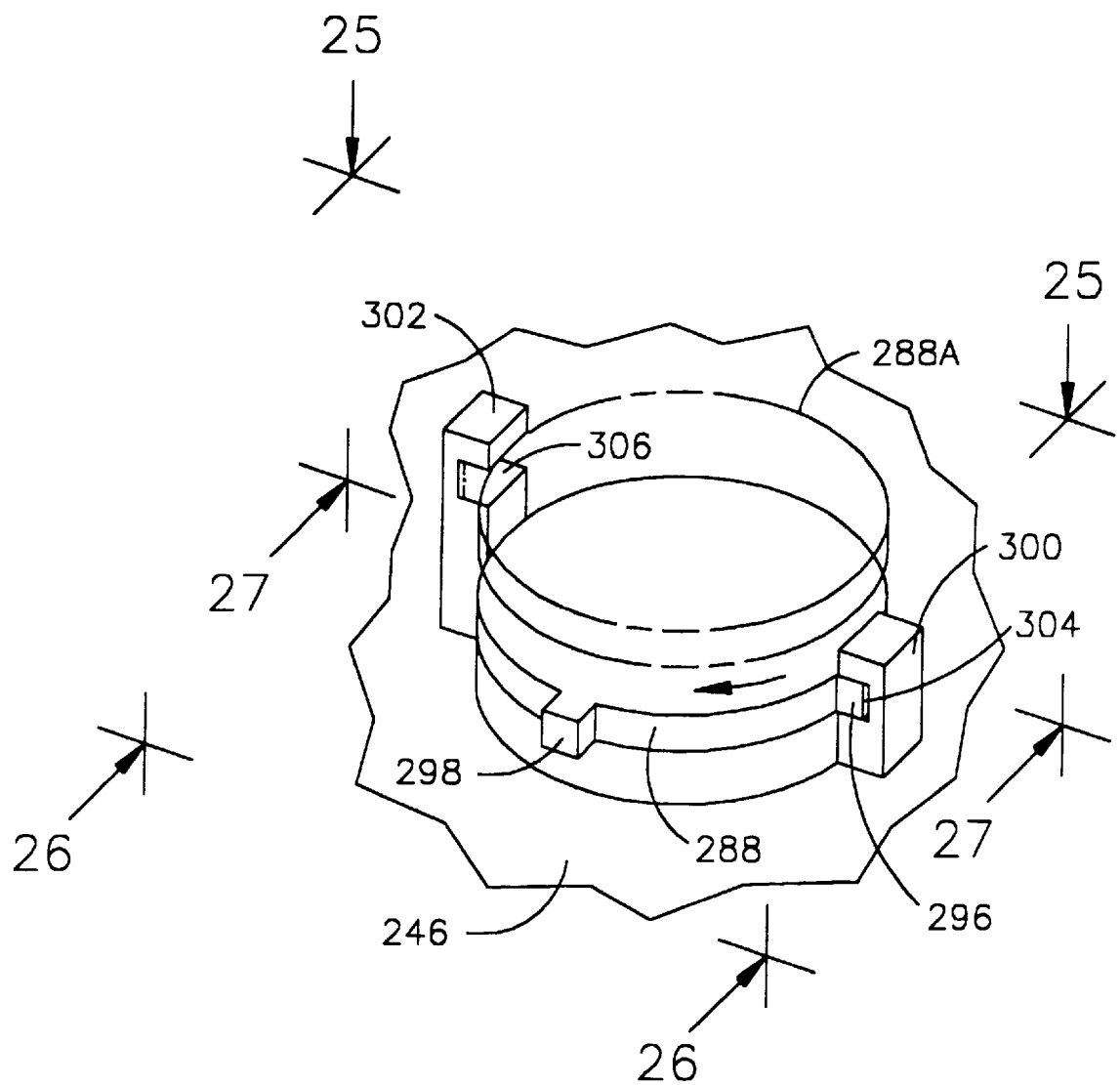
FIG. 23 is an isolated perspective view of the locking button shown in FIGS. 17–22 in the locked mode.

A rotating mechanism 242 indicated in FIGS. 17, 19, 20, and 21 and in detail in FIGS. 22 and 23 includes an inner cylinder 244 and an outer cylinder 246 both perpendicular, or transverse, to a flat wall 248 of the housing 250 for sign portion 232 and a flat wall 252 of the housing 254 for hand-grip portion 230. Flat wall 248 and flat wall 252 are facing one another in spaced planar parallel relationship.

Figure 22A:
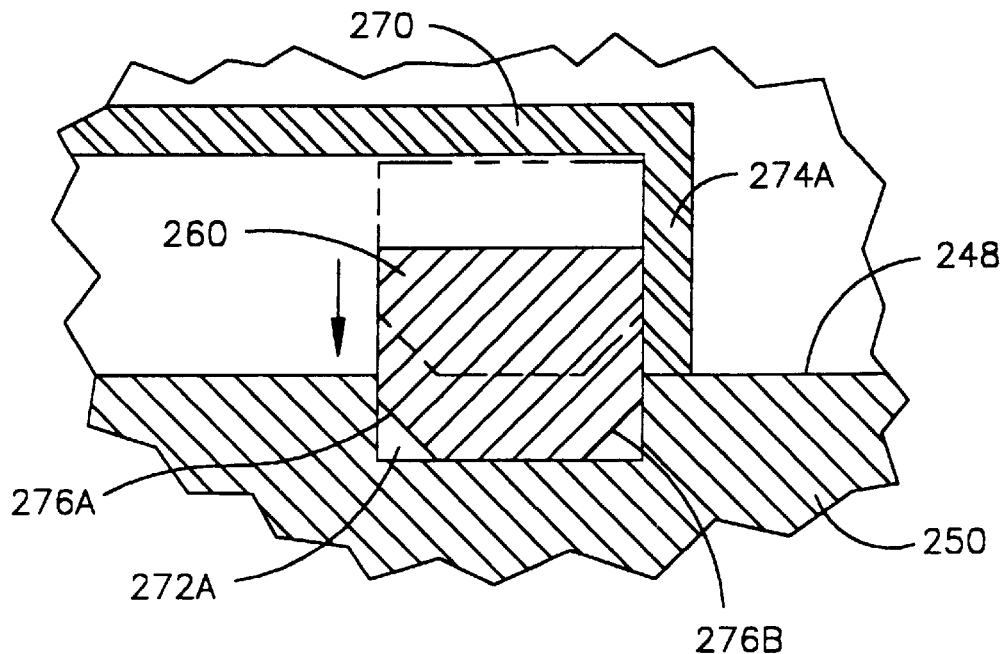
FIG. 22A is a sectional view of one of the track stops and one of the feet from the rotatable mechanism positioned in a holding slot in the wall of the sign housing taken through line 22A of FIG. 22.
Figure 22B:
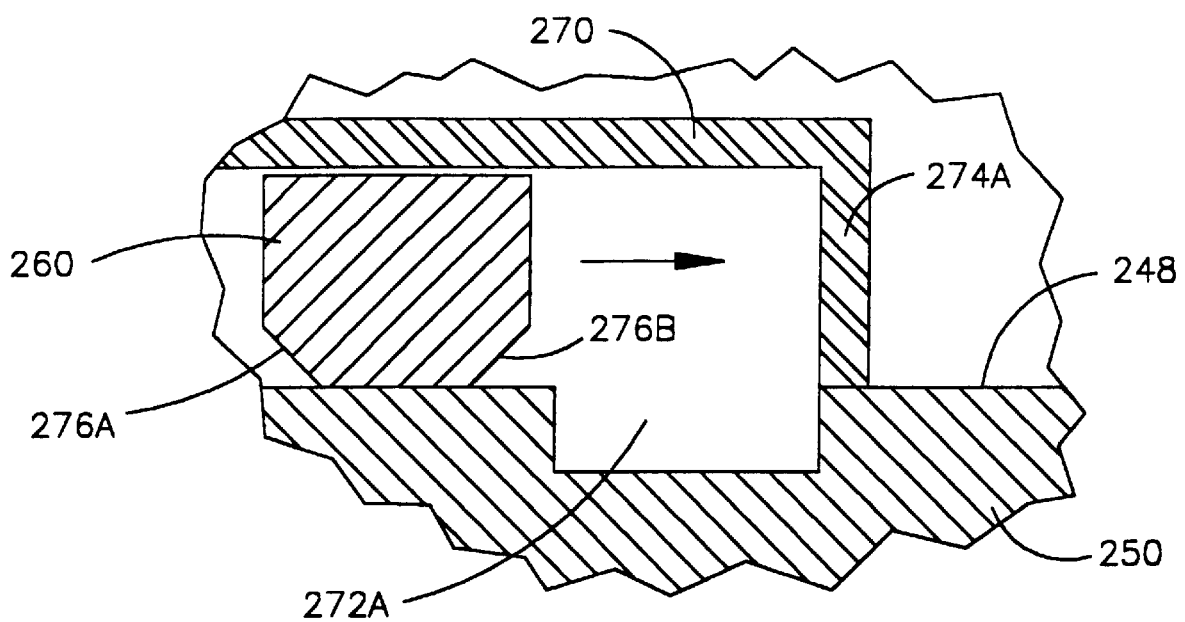
FIG. 22B is a sectional view similar to the sectional view of FIG. 22A taken immediately before the foot shown in FIG. 22A arrives at the stop shown in FIG. 22A.

As seen best in FIG. 23 and also in FIG. 22 but also seen in FIGS. 17, 19, and 20, inner cylinder 244 and outer cylinder 246 of rotatable mechanism 242 are concentrically aligned in rotatable adjacent relationship around center line 240 with the opposed pairs of circular rims of each also being in alignment. Inner cylinder 244 is unitary with hand-grip portion 230 by connection at a circular rim 256 to flat wall 256 of hand-grip housing 254. Outer cylinder 246 is unitary with sign portion 232 by connection at a circular rim 258 to flat wall 246 of sign housing 248. Hand-grip portion 230 and sign portion 232 are held together both in the locked in-use relationship shown in FIG. 17 and during an unlocked rotatable relationship shown in FIG. 19 and finally in the locked compact relationship shown in FIG. 20 by two feet 260 connected to hand-grip housing 254 that are in sliding gripping relationship with each of two tracks 262 that in turn are connected to sign housing 250. As shown in FIGS. 17, 19, 20, and 21, tracks 262 extend laterally in spaced parallel relationship along flat wall 252 of sign portion 232. Each track 262 includes a flange 268 that is unitary with flat wall 248 of sign housing 250. Each flange 268 is short in cross-section as seen in FIG. 23 and is oriented transverse to flat wall 248. Each track 262 also includes a flat retaining frame 270 connected to each flange 268 that extends transversely as seen in cross-section in FIG. 23 to outer cylinder 246. Each flange 268 and retaining frame 270 defines an elongated groove 272 in which each of feet 260 are slidably retained. In the operation of placing hand-grip portion 230 in the compact store mode as seen in FIG. 20, after hand-grip portion 230 has been rotated to a position that is lateral to the elongated dimension of sign portion 232, hand-grip portion 230 is manually slid laterally inwardly relative to sign portion 232 wherein feet 260 are slid along tracks 262, specifically within grooves 272 until feet 260 encounter inner track stops 274A. In the reverse operation, hand-grip portion 230 is manually slid laterally outwardly from the compact mode along tracks 270 until feet 260 encounter a second set of outer track stops 274B. FIGS. 22A and 22B show in isolation the movement of one of feet 260 along track 262 to inner stop 274. Feet 260 are made of a biasable material such as plastic and when positioned in grooves 272 are in a biased mode. Each of feet 260 includes opposed tapers 276A and 276B and flat wall 248 of sign housing 250 defines a pair of opposed slots 278A that adjoin inner stops 274A into which feet 260 are self-biased from the biased mode into the unbiased mode and lock into place. When hand-grip portion 230 is pulled laterally from the compact mode to a position for rotation to the vertical in-use mode along tracks 262, feet 260 are pulled from slots 278A so that tapers 276A slide over the edges of slots 278A. Likewise, similar grooves 272B similar to grooves 272A defined in flat wall 248 at outer stops 274B receive self-biased feet 260 when feet 260 self-bias from a biased mode to a biased mode when arrested in movement at outer stops 274B when hand-grip portion 230 is pulled from the compact stored mode and slid laterally to a position for rotation to the vertical in-use mode.

An optional locking peg 280 shown in FIGS. 17, 20, and 21 that is connected to hand-grip portion 230 extends transversely into hand-grip portion into a hole 282 defined in flat wall 248 of sign housing 250 to hold hand-grip portion stable during use. Hole 282 is located in flat wall 248 slightly below LCD 234. Locking peg 280, which extends through hand-grip portion 230 and is restrained in its movements relative to hand-grip portion 230 in a manner known in the art, is pulled slightly from hole 282 to release its grip therein. In a reverse manner, peg 280 is pushed into hole 282 to hold hand-grip portion 230 in the compact mode.

During the rotational movement of hand-grip portion 230 relative to sign portion 232 shown in FIG. 18, the operation of rotatable mechanism 242 includes the rotation of inner cylinder 244 relative to outer cylinder 246 as seen best in FIGS. 22 and 23. FIG. 20 shows the position of rotatable locking mechanism 242 in the full compact stored mode with feet 260 at inner track stops 274A.

Figure 27:
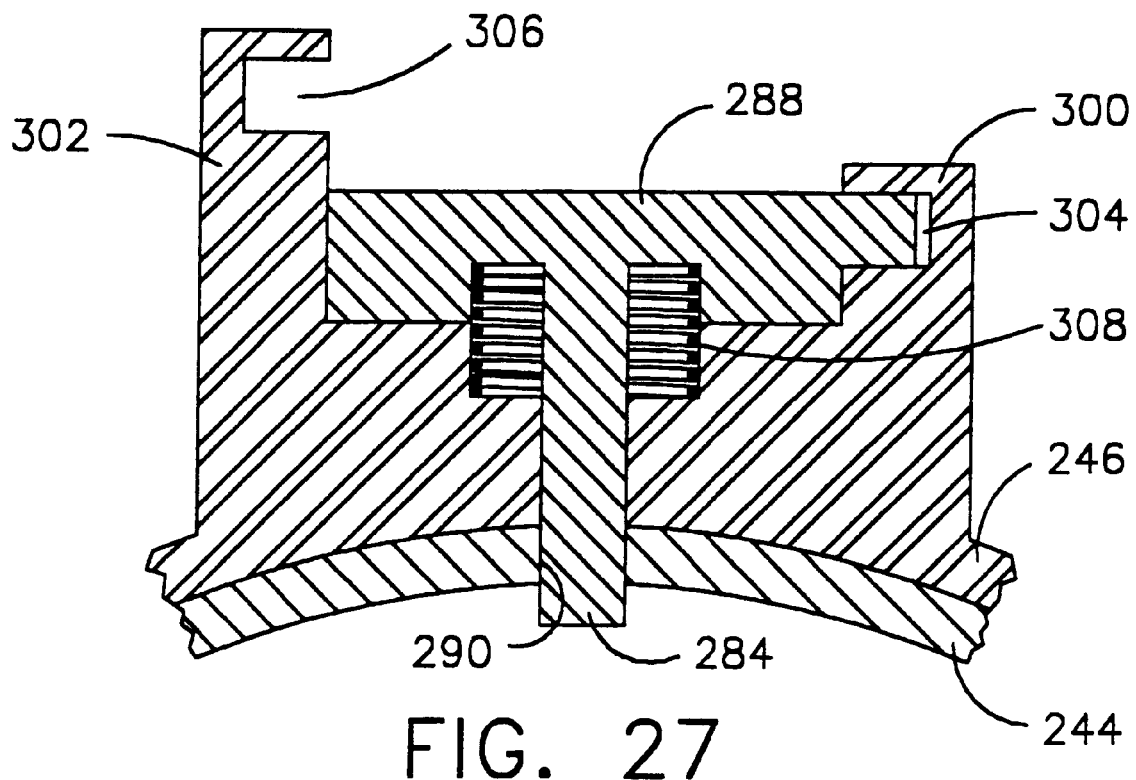
FIG. 27 is a sectional view of the locking button in the locked mode taken through line 27—27 in FIG. 23.
Figure 28:
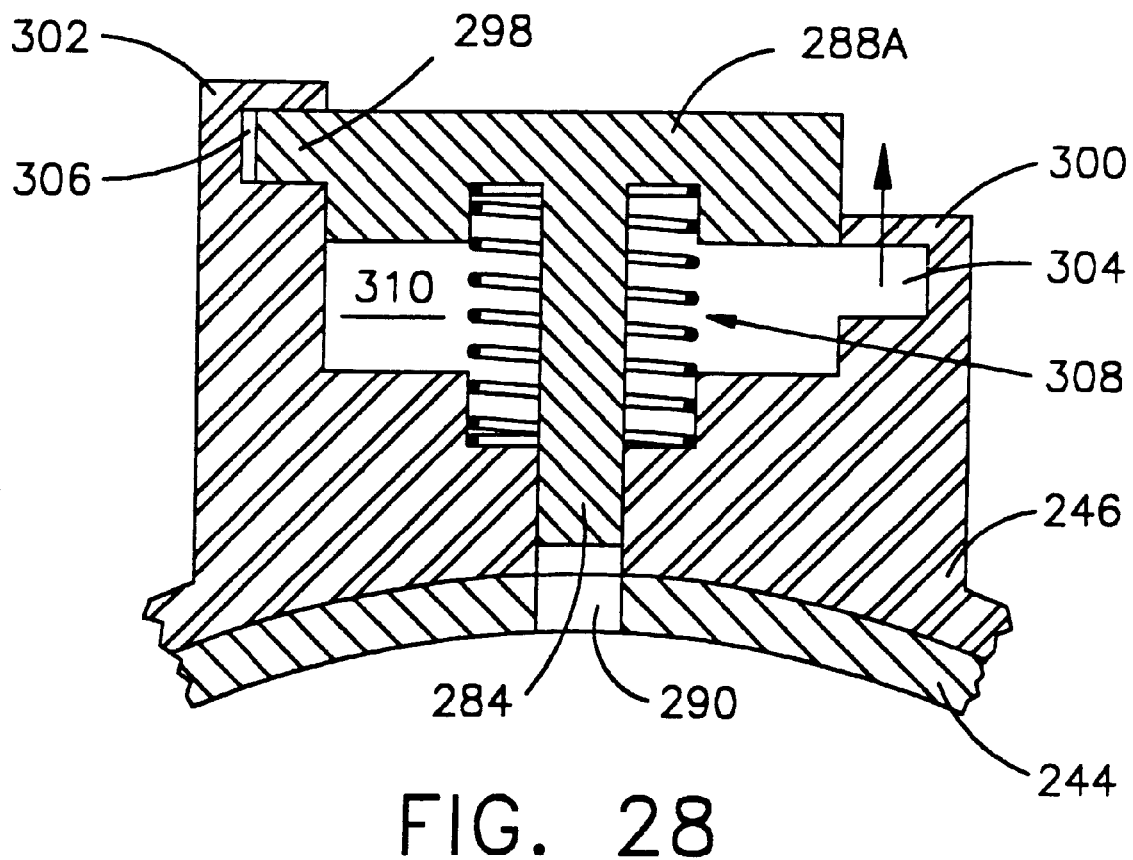
FIG. 28 is a sectional view analogous to the view shown in FIG. 27 with the locking button in the unlocked mode.

Rotatable locking mechanism 242 includes a cylindrical locking pin 284 seen best in FIGS. 22, 27 and 28. Locking pin 284 extends radially inwardly relative to inner and outer cylinders 244 and 246 through a first pin hole 286 defined in outer cylinder 246 that extends in radial alignment with center-of-rotation 240. Locking pin 284 is surmounted by a cylindrical button 288 that is positioned for manual operation outside of outer cylinder 246. Inner cylinder 244 defines a second pin hole 290 in radial alignment with center-of-rotation 240 and a third pin hole 292 in diametric alignment with center-of-rotation 240 at 90 cicumferential degrees from second pin hole 290. Locking pin 284 extends through both outer cylinder 246 and inner cylinder 244 in the locked mode of rotatable locking mechanism 242. FIG. 22 shows locking pin 284 extending through second pin hole 290 so that inner cylinder 244 and outer cylinder 246 are locked together. When locking pin 284 is slid from second pin hole 290, inner cylinder 244, which is unitary with hand-grip portion 230, is rotatable within rotatable locking mechanism 242 as hand-grip portion is rotated. When hand-grip portion 230 is rotated to the in-use mode vertical in orientation to sign portion 228 as shown in FIG. 17, locking pin 284 is then pushed into third pin hole 292 so that rotatable locking mechanism 242 is locked and hand-grip portion 230 cannot be rotated relative to sign portion 228. Again, sign portion 230 is freed from its locked relationship with sign portion 228 by pulling locking pin 286 from third pin hole 294.

Figure 24:
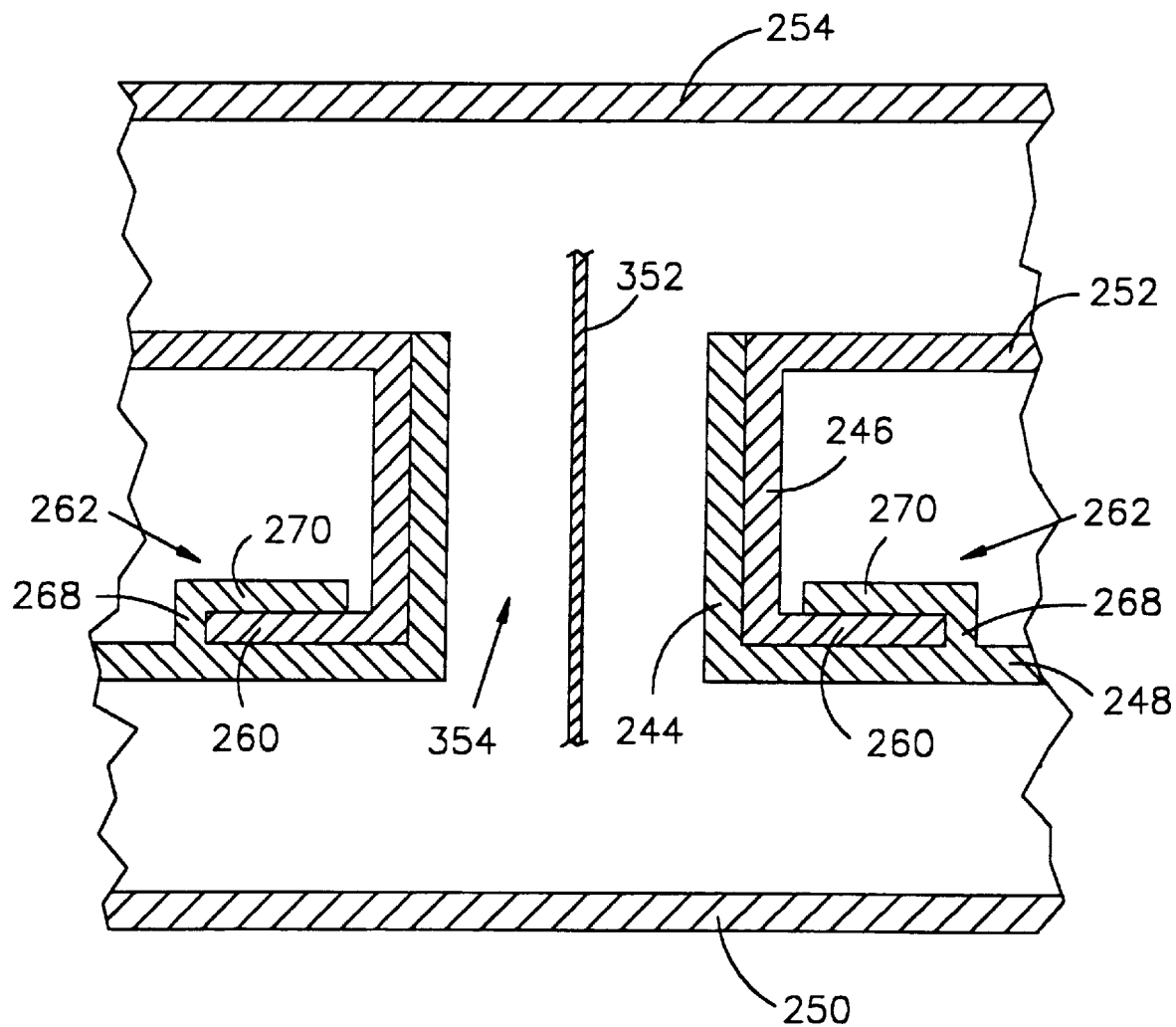
FIG. 24 is a sectional view of the cylindrical rotating mechanism taken through line 24—24 in FIG. 17.
Figure 25:
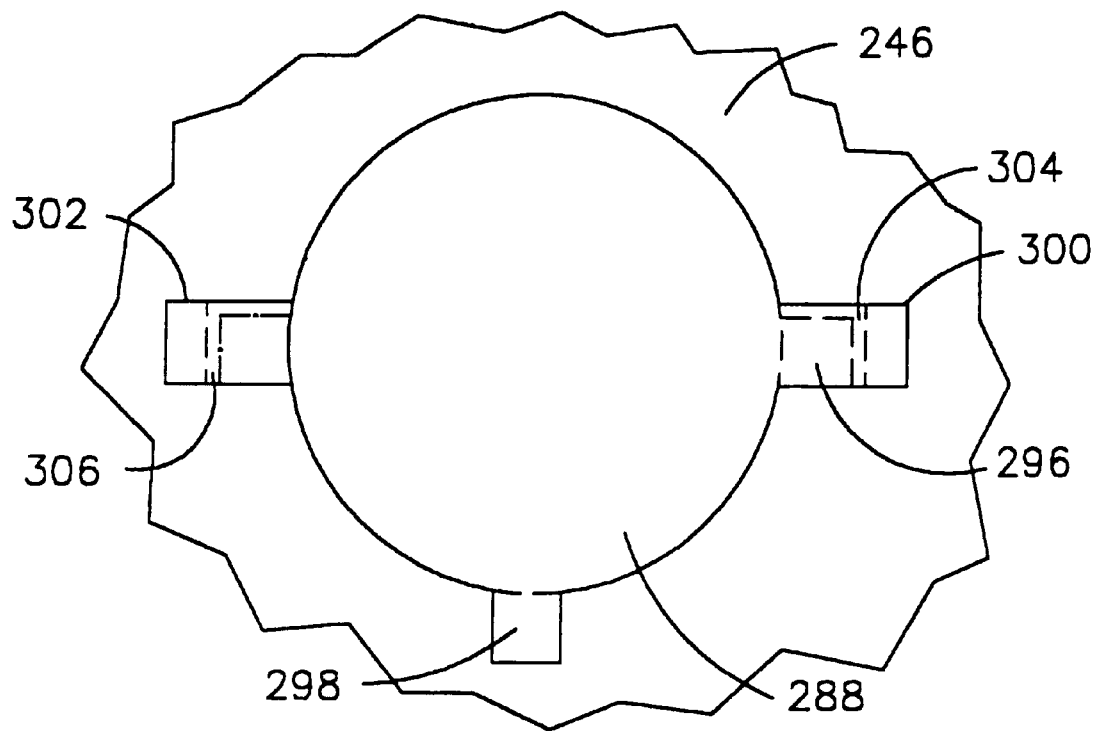
FIG. 25 is a top view of the locking button in the locked mode taken through the plane 25—25 in FIG. 23.
Figure 26:
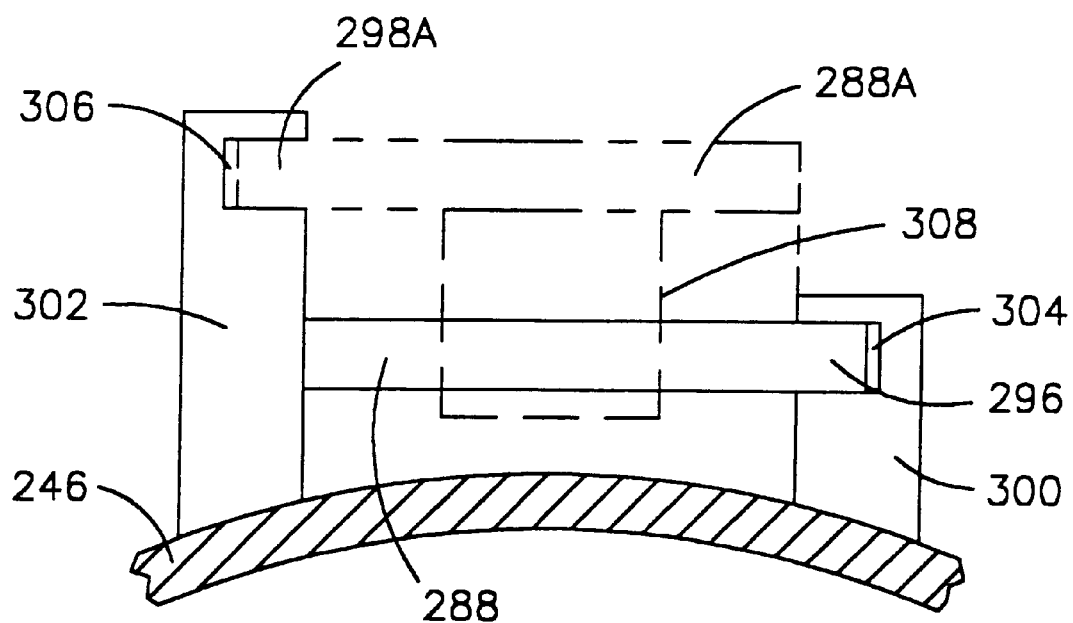
FIG. 26 is a side view of the locking button taken through the plane 26—26 in FIG. 23 with a side view of the locking button in the unlocked mode shown in phantom line.

The inward radial movement of locking pin 286 is accomplished by operation of a biasable mechanism 287 that includes a pressing button 288, shown in FIGS. 17, 20,21, 22, 23, 25, 26, and particularly in FIG. 28, downwardly to the position shown in FIGS. 22, 23, and 27 in order to force locking pin 284 through first pin hole 286 where it is always engaged further through either second or third pin holes 290 or 292 as inner cylinder 244 is rotated to such position where second pin hole 290 or pin hole 292 is aligned with first pin hole 286. First and second locking fingers 296 and 298 seen in FIGS. 23, 25, 26, 27, and 28 and also in part in FIG. 22 extend diametrically outwardly from the top of circular button 288 at 90 degrees. A short post 300 and a high post 302 connected to outer cylinder 246 best seen in FIG. 24 but also in FIGS. 22, 25, 26, 27, and 28 define locking slot 304 and stop slot 306, respectively, for receiving finger 296 and stop finger 298, respectively. After alignment with either selected hole 286, button 288 is pressed inwardly as described relative to FIG. 28 so as to press locking pin 284 from its disengaged mode as shown in FIG. 28 to an engaged mode as shown in FIG. 27. FIGS. 27 and 28 show a pin hole in inner cylinder 244 that can be either pin hole 290 or 292. After engagement of locking pin 284 in either pin hole 290 or 292, button 288 is rotated so as to engage locking finger 296 within locking slot 304. After disengagement of locking finger 296 from locking slot 304 by rotation of button 288, button 288 can be rotated so as to engage stop finger 298 within stop slot 306 so as to prevent locking pin 284 from sliding from engagement with rotatable mechanism 242. Integral with button 288 and locking pin 284 is a coil spring 308 encircled about locking pin 284, which is positioned as the core of coil spring 308. A cylindrical spring recess 310 is defined in part by the underside of button 288 and by outer cylinder 246 which serves to seat coil spring 308. Coil spring 308 is shown in its biased mode in FIG. 27 with locking pin 284 extending through first pin hole 286 and selected second or third pin hole 290 or 292. After disengagement of first locking finger 296 from its locked mode at short post 300, coil spring 308 self-biases from its biased mode in FIG. 27 into its biased mode in FIG. 28 with the result that locking pin 284 pulls away from engagement with inner cylinder 244 in particular from one of the selected second or third pin holes 290 or 292 so as to release inner cylinder 244 for rotational movement in either of the two rotational directions by movement of hand-grip portion 230. Stop finger 298 is then engaged at stop slot 306. The other of first and second pin holes 290 or 292 is then aligned with first pin hole 286 at which point stop finger 298 is rotated for release from stop slot 306 and button 288 is pressed radially inwardly so as to force coil spring 308 into the biased mode once again and locking finger is engaged with locking slot 294 into the position shown in FIG. 27.

Figure 29:
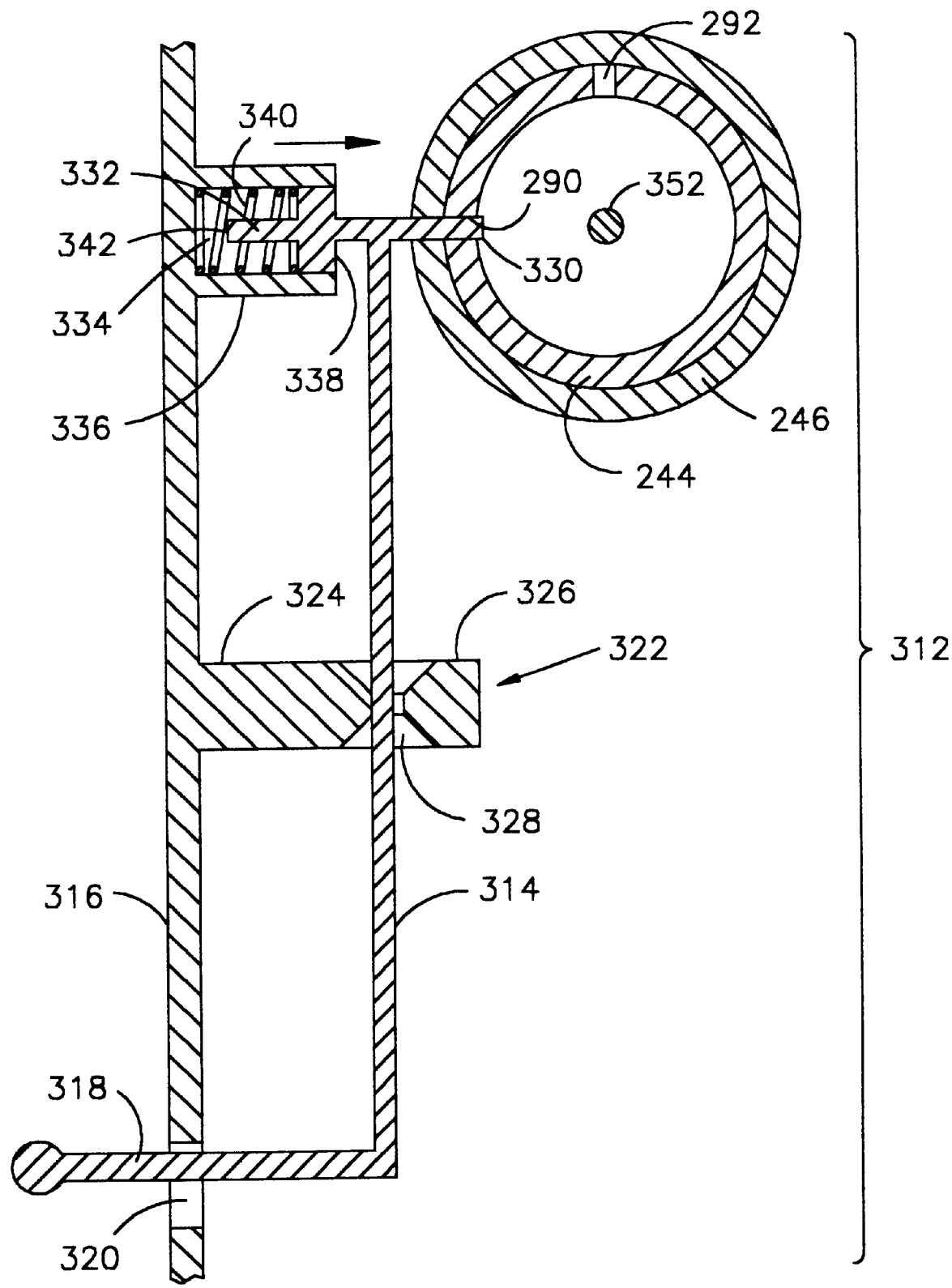
FIG. 29 is an abstract sectional view of an alternative bias-operated locking pin mechanism that includes a lever arm and the inner and outer cylinders of the rotatable mechanism shown in an locked mode.
Figure 30:
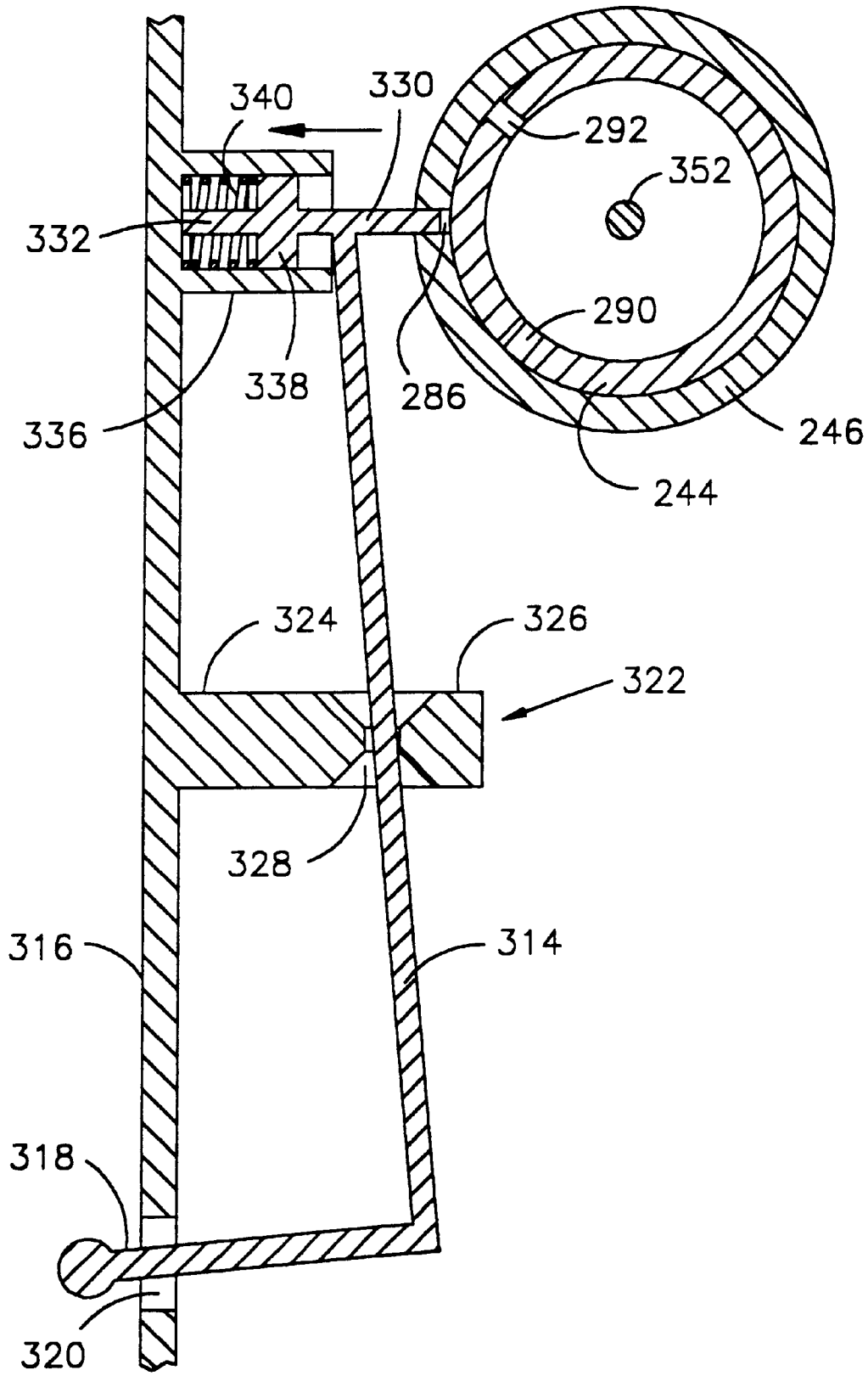
FIG. 30 is a sectional view analogous to the view shown in FIG. 29 with rotatable mechanism shown in an unlocked mode.

An alternative biasable to biasable mechanism 287 is biasable mechanism 312 shown in isolation in FIGS. 29 and 30. Biasable mechanism 312 includes a lever arm 314 extending parallel to and spaced from a side wall 316 of housing 250 for hand-grip portion 230. A lever handle 318 is unitary with lever arm 314 at one end of lever arm 314 extending at right angles therefrom and passing through an aperture 320 in side wall 315 to a distance beyond side wall 315 where lever handle 318 is operable. The midpoint of lever arm 314 passes through a double fulcrum 322 that includes a first fulcrum 324 that is integral with side wall 316 and a second fulcrum 326 that is also integral with first fulcrum 324. Double fulcrum 322 defines an aperture 328 between first and second fulcrums 324 and 326 through which lever arm 314 passes at its midpoint. At the opposite end of lever arm 314 and integral therewith is a locking pin 330 that in FIG. 29 is shown radially extending through first pin hole 286 of outer cylinder 246 and a selected one of second and third pin holes 290 and 292 previously discussed as that the inner and outer cylinders 244 and 246 of rotatable locking mechanism 242 are locked in a non-rotatable mode. At the opposite end of radial locking pin 330 extending linearly therefrom and integral with lever arm 314 is a piston pin that is slidably mounted in a cylindrical chamber 334 defined by a cylindrical block 336 that is integral with side wall 316. A cylindrical piston head 338 integral with piston pin 332 is slidably positioned within cylindrical piston chamber 334 in contact with the inner cylindrical surface of cylinder block 336. A portion of piston pin 332 located between piston head 338 and side wall 316 within cylindrical piston chamber 334 is positioned within a coil spring 340 as the core of coil spring 340. Free end 342 of piston pin 332 is positioned at a distance from side wall 316 and coil spring 340 is fully extended in an unbiased mode between piston head 338 and side wall 316 within cylindrical piston chamber 334.

As seen in FIG. 30, locking pin 330 has been withdrawn from engagement with the selected one of second and third pin holes 290 and 292 so as to make free the rotation of inner cylinder 244 relative to outer cylinder 246. This withdrawal of locking pin 330 is accomplished by the pressing inwardly relative to side wall 316 lever handle 318 through wall aperture 320, which is sufficiently extensive to allow the angular movement of lever handle 318. The inward movement of lever handle 318 causes lever arm 314 to lever press against second fulcrum 328 and simultaneously piston head 338 and piston pin 332 move in piston chamber 334 towards side wall 316 so that coil spring 340 is compressed into a biased mode. The biased mode of coil spring 340 is maintained as long as an inward pressure is maintained at lever handle 318. When lever handle 318 is released, coil spring 340 self-biases into an unbiased mode so that piston head 338 along with locking pin 330 are pressed radially relative to rotatable locking mechanism 242. A full locking position of locking pin 330 is only accomplished when a selected one of the two pin holes 290 and 292 is rotated into alignment with first pin hole 286 and the inward pressure on lever arm 314 is released that biasable mechanism assumes the mode of operation shown in FIG. 29. During the rotation of lever arm 314 from the unlocked mode shown in FIG. 30 to the locked mode shown in FIG. 29, lever arm 314 is pressed against first fulcrum 324.

Lever arm 314, lever handle 318, locking pin 330, piston pin 332, and piston head 338 are unitary and preferably made of a flexible, resilient plastic material that will bend to accommodate changes in configuration caused by the changes in angularity caused by mechanical forces during withdrawal and insertion of locking pin 330 in its radial movements during operation of lever arm 314.

A miniaturized central microprocessor 344 indicated by dashed line in FIG. 21 for processing data is mounted within sign portion housing 250 in hand-grip portion 230. A miniaturized keyboard microprocessor 346 operatively connected with keyboard 236 is also mounted within hand-grip portion 124. Keyboard microprocessor 346 is for receiving input data from keyboard 346 and transmitting the data to microprocessor 344. LED 238 shown in FIGS. 18 and 21 presents the data entered at keyboard 236 by way of central microprocessor 344 in visual form to observers. A miniaturized message display microprocessor 348 indicated in dashed line in FIG. 21 converts the input data received from central microprocessor 344 for entry at LED 238. A miniaturized message display microprocessor 350 converts the input data received from central microprocessor 344 for entry at LCD monitor 234. A circuit line 352 carries signals from central microprocessor in hand-grip housing 250 to LED microprocessor through a cylindrical passage 354 defined by inner and outer cylinders 244 and 246 seen best in FIGS. 21, 22, and 24. The circuit is analogous to the circuit set forth in FIG. 9 relating to programmable sign 118.

Although the present invention has been described in some detail by way of illustration and example for purposes of clarity and understanding, it will, of course, be understood that various changes and modifications may be made in the form, details, and arrangements of the parts without departing from the scope of the invention as set forth in the following claims.

What is claimed is:

1. A portable programmable sign, comprising, in combination,
  a hand-grip housing having front and rear hand-grip housing sides,
  a sign housing having front and rear sign housing sides,
  miniaturized microprocessor means for processing data mounted within the sign,
  keyboard means mounted in said hand-grip housing for receiving input data and transmitting the input data to said microprocessor means, said keyboard means including a keyboard miniaturized microprocessor,
  message display means for presenting the input data to an observer, said message display means including a message display mounted on said front sign housing side,
  said hand-grip housing being rotatably mounted with said sign housing wherein said hand-grip housing is rotatable between an in-use position wherein said hand-grip housing is transverse to said sign housing and a compact position wherein said hand-grip housing is positioned in overlapping relationship with said sign housing,
  rotatable mechanism means for connecting said sign housing and said hand-grip housing for movement between said in-use position and said compact position, said rotatable mechanism means being connected to said first and second housings,
  locking means associated with said rotatable mechanism means for locking said first and second housings in one of a selected said in-use position and said compact position,
  circuit means for electrically joining said keyboard means, said microprocessor means and said message display means,
  power means for supplying electrical current to said circuit means, and
  on/off means for connecting and disconnecting said circuit means with and from said power means.

2. The sign according to claim 1, wherein said message display means is a light-emitting display, said light-emitting display being a light-emitting diode (LED) display.

3. The sign according to claim 1, further including monitor display means for receiving the input data from said microprocessor means prior to transmission of the input data to said message means and for displaying the data on a monitor display to a user at said rear side of said sign portion of said housing for editing and verification of the input data by the user prior to the data being transmitted to said message means, said monitor display means being mounted within said hand-grip housing, said circuit means being also for electrically connecting said keyboard means and said microprocessor means with said monitor means.

4. The sign in accordance with claim 3 wherein said monitor display is mounted in said hand-grip portion.

5. The sign in accordance with claim 3, wherein said monitor display is a liquid crystal display (LCD).

6. The sign in accordance with claim 1, wherein said rotatable mechanism means includes an inner cylinder secured to said sign housing and an outer cylinder connected to said hand-grip housing, said outer cylinder being rotatable relative to said inner cylinder during rotation of said hand-grip housing between said in-use mode and said compact position.

7. The sign in accordance with claim 6, further including a pair of spaced tracks connected to and extending transversely across said rear housing side, each of said tracks defining an elongated track recess, and further including a pair of opposed feet connected to the circumference of said inner cylinder that are slidably mounted in interconnected relationship in said track recesses.

8. The sign in accordance with claim 6, wherein said inner cylinder defines first and second pinholes at 90 degree relationship and said outer cylinder defines a third pinhole, said outer cylinder being rotatable so as to align said third pinhole with one of a selected first and second pinhole, and further including a locking pin that is slidably mounted in said third pinhole and slidably insertable and slidably removable from said one of a selected first and second pinhole.

9. The sign in accordance with claim 8, further including a biasable element connected to said locking pin, said biasable element being movable between biased and unbiased modes, wherein in said biased mode said locking pin is an inserted position in a selected one of said first and second pinholes and in said unbiased mode said locking pin is withdrawn from said one of said first and second pinholes.

10. The sign in accordance with claim 9, wherein said locking pin includes an outer end external to said locking mechanism means and further including a button connected to said locking pin at said outer end and said biasable element being a coil spring mounted to said locking pin.

11. The sign in accordance with claim 10, further including locking means for releasably holding said locking pin in said biased position.

12. The sign in accordance with claim 11, further including locking means for releasably holding said locking pin in said unbiased position.

13. The sign in accordance with claim 8, further including a biasable element connected to said locking pin, said biasable element being movable between biased and unbiased modes, wherein in said unbiased mode said locking pin is an inserted position in a selected one of said first and second pinholes and in said biased mode said locking pin is withdrawn from said one of said first and second pinholes.

14. The sign in accordance with claim 13, further including a fulcrum means mounted within said hand-grip housing and a lever arm having opposed first and second ends rotatably mounted within said hand-grip housing at said fulcrum means, said fulcrum means being for providing a fulcrum for rotational movements of said first and second ends relative to said fulcrum, and further including a lever handle at said first end, said hand-grip housing including a hand-grip housing wall, said wall defining an aperture, said lever arm being parallel with said wall, said lever handle extending though said aperture, said locking pin being connected to said second end and further including a piston block connected to said wall and a piston pin extending linearly from said locking pin, said piston pin having a piston head, said biasable element being a coil spring positioned around said piston pin, said piston head, said piston pin and said coil spring being positioned in said piston block, said said coil spring being movable between said biased and unbiased positions in said piston block.

15. The sign in accordance with claim 14, wherein said lever arm, said lever handle, said locking pin, said piston pin, and said piston head 338 are unitary and made of a flexible, resilient plastic material.

16. The sign in accordance with claim 1, further including keeper means for holding said sign housing and said hand-grip housing in said in-use position, said keeper means being a peg extending through said hand-grip housing and into said sign housing in said in-use position, said peg being slidably retractable from said hand-grip housing to allow rotational movement of said hand-grip housing relative to said sign housing.

\* \* \* \* \*